(12) United States Patent
Tanigawa et al.

(10) Patent No.: US 9,229,157 B2
(45) Date of Patent: Jan. 5, 2016

(54) SOLD PHOTONIC BAND GAP FIBER, FIBER MODULE USING SOLD PHOTONIC BAND GAP FIBER, FIBER AMPLIFIER, AND FIBER LASER

(71) Applicants: Fujikura Ltd., Koto-ku, Tokyo (JP); National University Corporation Hokkaido University, Sapporo-shi, Hokkaido (JP)

(72) Inventors: Shoji Tanigawa, Sakura (JP); Katsuhiro Takenaga, Sakura (JP); Masahiro Kashiwagi, Sakura (JP); Kunimasa Saitoh, Sapporo (JP)

(73) Assignees: FUJIKURA LTD., Tokyo (JP); National University Corporation Hokkaido University, Sapporo-shi (JP)

(*) Notice: Subject to any disclaimer, the term of this patent is extended or adjusted under 35 U.S.C. 154(b) by 350 days.

(21) Appl. No.: 13/851,660

(22) Filed: Mar. 27, 2013

(65) Prior Publication Data

US 2013/0209046 A1    Aug. 15, 2013

Related U.S. Application Data

(63) Continuation of application No. PCT/JP2011/072138, filed on Sep. 28, 2011.

(30) Foreign Application Priority Data

Sep. 28, 2010    (JP) .................................. 2010-217798

(51) Int. Cl.
*G02B 6/036*    (2006.01)
*G02B 6/02*    (2006.01)
(Continued)

(52) U.S. Cl.
CPC ........ *G02B 6/02009* (2013.01); *G02B 6/02347* (2013.01); *G02B 6/0281* (2013.01); *H01S 3/06741* (2013.01)

(58) Field of Classification Search
None
See application file for complete search history.

(56) References Cited

U.S. PATENT DOCUMENTS 7,636,505 B2    12/2009    Tassone
2004/0136669 A1    7/2004    Hasegawa et al.
(Continued)

FOREIGN PATENT DOCUMENTS

CN    1542471 A    11/2004
EP    2120073 A1    11/2009
(Continued)

OTHER PUBLICATIONS

Communication dated Mar. 9, 2015, issued by the State Intellectual Property Office of the People's Republic of China in corresponding Chinese Application No. 201180037557.7.
(Continued)

*Primary Examiner* — Sung Pak
(74) *Attorney, Agent, or Firm* — Sughrue Mion, PLLC

(57) ABSTRACT

A solid photonic band gap fiber includes: a core area located at a central portion of a cross-section with respect to a longitudinal direction of the fiber, the core area being formed of a solid substance having a low refractive index; cladding areas having base portions formed of a solid substance having a low refractive index, the cladding areas surrounding the core area; and a plurality of fine high refractive index scatterers provided in the cladding areas, and disposed in a dispersed manner so as to surround the core area, the number of fine high refractive index scatterers being formed of a solid substance having a high refractive index, wherein in a state that the solid photonic band gap fiber is held at a predetermined bending radius, propagation in a high-order mode is suppressed by using a difference in a bending loss between a fundamental mode and the high-order mode, and only the fundamental mode is substantially propagated, the fundamental mode and the high-order mode being caused by bending.

16 Claims, 12 Drawing Sheets

(51) Int. Cl.
*H01S 3/067* (2006.01)
*G02B 6/028* (2006.01)

(56) References Cited

U.S. PATENT DOCUMENTS

| | | |
|---|---|---|
| 2005/0157998 A1 | 7/2005 | Dong et al. |
| 2009/0041063 A1 | 2/2009 | Saitou |
| 2009/0220202 A1 | 9/2009 | Taru |
| 2010/0157418 A1* | 6/2010 | Dong et al. .............. 359/341.3 |
| 2011/0194826 A1* | 8/2011 | Nagashima et al. .......... 385/123 |

FOREIGN PATENT DOCUMENTS

| | | | |
|---|---|---|---|
| JP | 2007-123594 A | 5/2007 | |
| JP | 2007123594 A | 5/2007 | |
| JP | 2007-522497 A | 8/2007 | |
| JP | 2007522497 A | 8/2007 | |
| JP | 2007-316526 A | 12/2007 | |
| JP | 2007316526 A | 12/2007 | |
| JP | 2008-233927 A | 10/2008 | |
| JP | 2008233927 A | 10/2008 | |
| JP | 2009-211066 A | 9/2009 | |
| JP | 2009211066 A | 9/2009 | |
| WO | 2005/070170 A2 | 8/2005 | |
| WO | 2009/107824 A1 | 9/2009 | |
| WO | WO 2010020251 A1 * | 2/2010 | .............. H01S 3/067 |

OTHER PUBLICATIONS

Masahiro Kashiwagi, Kimimasa Saito, Katsuhiro Takenaga, Shoji Tanigawa, Shoichiro Matsuo, Munehisa Fujimaki, "Effective Single-Mode Solid Photonic Bandgap Fiber with Low Bending Loss and Large Mode Area", Lecture paper 2 at Communication Society Meeting of the Institute of Electronics, Information and Communication Engineers in 2011, Japan, the Institute of Electronics, Information and Communication Engineers, Aug. 30, 2011, p. 343.

Communication dated Sep. 9, 2014 issued by the Japanese Patent Office in counterpart Application No. 2010217798.

Jay W. Dawson, et al., "Large flattened mode optical fiber for reduction of non-linear effects in optical fiber lasers", Fiber Lasers: Technology, Systems, and Applications, Proc. of SPIE, Bellingham, WA, 2004, pp. 132-139, vol. 5335.

John M. Fini, et al., "Bend-resistant design of conventional and microstructure fibers with very large mode area", Optics Express, Jan. 9, 2006, pp. 69-81, vol. 14, No. 1.

Jeffrey P. Koplow, et al., "Single-mode operation of a coiled multimode fiber amplifier", Optics Letters, Apr. 1, 2000, pp. 442-444, vol. 25, No. 7.

Ming-Jun Li, et al., "Effective Area Limit for Large Mode Area Laser Fibers", OFC/NFOEC, 2008, pp. 1-3.

J. Limpert, et al., "Extended single-mode photonic crystal fiber lasers", Optics Express, Apr. 3, 2006, pp. 2715-2720, vol. 14, No. 7.

Hugh A McKay, et al., "Single-mode Optical Fibres with Record Core Diameters", ECOC, Th.3.C.1, Sep. 21-25, 2008, Brussels, Belgium, pp. 1-2, vol. 7-1.

Liang Dong, et al., "Robust and Practical Optical Fibers for Single Mode Operation with Core Diameters up to 170 μm", Proc. of CLEO/QELS, CPDB6, 2008, pp. 1-2.

M. Craig Swan, et al., "33 μm Core Effectively Single-Mode Chirally-Coupled-Core Fiber Laser at 1064- nm", Proc. of OFC/NFOEC, OWU2, 2008, pp. 1-3.

John M. Fini, et al., "Design of Solid and Microstructure fibers for suppression of higher-order modes", Optics Express, May 2, 2005, pp. 3477-3490, vol. 13, No. 9.

O.N. Egorova, et al., "Single-mode all-silica photonic bandgap fiber with 20- μm mode-field diameter", Optics Express, Aug. 4, 2008, pp. 11735-11740, vol. 16, No. 16.

Kunimasa Saitoh, et al., "Photonic Band-Gap Fibers and Their Future Prospects", The Institute of Electronics, Information and Communication Engineers, Proc. of the IEICE Society conference, BS-7-8, 2009, pp. 1-2.

International Search Report of PCT/JP2011/072138 dated Dec. 27, 2011.

Communication dated Jul. 15, 2014, issued by the State Intellectual Property Office of the People's Republic of China in corresponding Chinese Application No. 201180037557.7.

Communication dated Dec. 2, 2014, issued by the Japan Patent Office in corresponding Japanese Application No. 2010-217798.

Michaille L et al: "Characteristics of a Q-switched multicore photonic crystal fiber laser with a very large mode field area", Optics Letters, Optical Society of America, vol. 33, No. 1, Jan. 1, 2008, pp. 71-73, XP001510532, ISSN: 0146-9592. DOI: 10.13 64/OL.33. 000071.

Chen et al: "All-solid silica-based photonic crystal fibers", Optics Communications, North-Holland Publishing Co. Amsterdam, NL, vol. 266, No. 1, Oct. 1, 2006, pp. 151-158, XP028081174, ISSN; 0030-4018, DOI: 10.1016/J.OPTCOM.2006.04.019 [retrieved on Oct. 1, 2006].

Dianov E M et al: "Solid-Core Photonic Bandgap Fibers for High-Power Fiber Lasers", IEEE Journal of Selected Topics in Quantum Electronics, IEEE Service Center, Piscataway, NJ, US, vol. 15, No. 1, Jan. 1, 2009, pp. 20-29, XP011280682, ISSN: 1077-260X, DOI: 10.1109/JSTQE.2008.2010247.

Communication dated Apr. 23, 2015 from the European Patent Office in counterpart application No. 11829156.6.

* cited by examiner

SOLD PHOTONIC BAND GAP FIBER, FIBER MODULE USING SOLD PHOTONIC BAND GAP FIBER, FIBER AMPLIFIER, AND FIBER LASER

CROSS REFERENCE TO RELATED APPLICATIONS

This application is a continuation application based on a PCT Patent Application No. PCT/JP2011/072138, filed Sep. 28, 2011, whose priority is claimed on Japanese Patent Application No. 2010-217798, filed Sep. 28, 2010, the entire content of which are hereby incorporated by reference.

BACKGROUND OF THE INVENTION

1. Field of the Invention

The present invention relates to an optical fiber for which the effective core cross-sectional area is enlarged in order to transmit high-power light and the like, and particularly, to a microstructure fiber including a wholly solid structure having fine high refractive index scatterers disposed in a dispersed manner in cladding areas that surround a core area (solid photonic band gap fiber), and an optical fiber module having the optical fiber.

Furthermore, the invention relates to a technique that maintains propagation of light in the optical fiber as single mode propagation, and enlarges the effective core cross-section of the optical fiber.

In addition, the invention relates to a fiber amplifier or a fiber laser which introduces excitation light into an optical fiber, amplifies signal light using induced emission caused by the excitation light, or oscillates and outputs a laser in technical fields of optical amplification and optical oscillation, an optical fiber in which the fiber amplifier or a fiber laser is preferably used, and an optical fiber module.

2. Description of the Related Art

When optical fibers are classified according to transmission modes, optical fibers are classified into multi-mode fibers and single mode fibers.

In terms of transmission characteristics, single mode fibers having characteristics such as a small transmission loss are overwhelmingly advantageous, and particularly in optical fibers used in fiber amplifiers or fiber lasers, an effect of improving the beam qualities of an output beam can be obtained by inhibiting high-order mode propagation, that is, substantially using a single mode fiber which realizes single mode propagation.

In addition, in recent years, remarkable advances have been made regarding techniques that increase the output of fiber amplifiers or fiber lasers.

Accompanying the development of techniques to increase the output of fiber amplifiers or fiber lasers, there has been a demand for optical fiber-type components including rare earth element-added fibers that are used for fiber amplifiers and fiber lasers to have resistance with respect to high-power light.

With regard to optical power, characteristics of an optical fiber to which attention should be paid are generally known to be optical damage and non-linear optical effects.

Both optical damage and non-linear optical effects are phenomena occurring when the power density (the optical power per unit light guide cross-sectional area) of light is high.

Therefore, the power density of light needs to be decreased in order to obtain high-output light while avoiding appearance of these undesirable phenomena.

In addition, the cross-sectional area through which light passes needs to be large in order to decrease the power density without decreasing the output power.

Here, as a general index of the light guide cross-sectional area, the definition of a so-called effective core cross-sectional area is used.

The effective core cross-sectional area $A_{\it{eff}}$ is defined using the following formula (1).

[Formula 1]

$$A_{\it{eff}} = \frac{2\pi \left[ \int_0^\infty |E(r)|^2 r dr \right]^2}{\int_0^\infty |E(r)|^4 r dr} \quad (1)$$

Where, in formula (1), E(r) indicates the electric field distribution of light inside an optical fiber, and r indicates the distance of the optical fiber in the radius direction.

Therefore, in recent years, a variety of active attempts for enlarging the effective core cross-sectional area have been made as described in, for example, Non-Patent Documents mentioned below.

Proc. of SPIE vol. 5335, p. 132-139 (2004) discloses a method of enlarging the effective core cross-sectional area by changing the shape of the refractive index distribution in the core of an optical fiber.

However, in that method, since the cutoff wavelength increases as the effective core cross-sectional area enlarges, there is a problem in that a tradeoff exists between single mode propagation necessary to maintain the beam qualities and enlargement of the effective core cross-sectional area.

In addition, in the refractive index distribution disclosed in Proc. of SPIE vol. 5335, p. 132-139 (2004), in a case that a fiber is used in a bent state, there is a problem in that the effective core cross-sectional area significantly decreases, (regarding the behaviors of the effective core cross-sectional area in a case that a fiber is bent, Opt. Express, 14, p. 69-81 (2006) discloses detailed investigation results).

In addition, Opt. Lett., vol. 25, p. 442-444 (2000) discloses a method which can substantially realize single mode propagation in a multi-mode fiber having a large effective core cross-sectional area by using a fiber having a high-order mode, and using the fiber in a bent state so as to cause bending loss in the high-order mode.

This method is being relatively widely used; however, as described in Proc. of OFC/NFOEC 2008, OTuJ2 (2008), the method also has a certain limitation in enlarging the effective core cross-sectional area since the effective core cross-sectional area decreases when a fiber is bent.

Therefore, there is a problem in that the effective core cross-sectional area cannot be sufficiently enlarged.

Opt. Express, 14, p. 2715-2720 (2006) and Proc. of ECOC 2008, Th. 3.C. 1 (2008) disclose a method in which the effective core cross-sectional area is enlarged using a photonic crystal fiber and a method in which the effective core cross-sectional area is enlarged by decreasing the relative refractive index difference respectively.

These methods can realize a larger effective core cross-sectional area than in the related art, but fibers used in all methods are difficult to bending, and therefore it is not possible to use the fibers in a bent state.

Therefore, it is not possible to realize a compact fiber amplifier or fiber laser.

Additionally, Proc. of CLEO/QELS 2008, CPDB6 (2008) discloses a method in which the effective core cross-sectional area is enlarged using a leakage fiber; however, similarly to the methods in Opt. Express, 14, p. 2715-2720 (2006) and Proc. of ECOC 2008, Th. 3.C. 1 (2008), a leakage fiber is difficult to bending, and there is another problem in that it is difficult to increase the oscillation efficiency of a laser or the amplification efficiency of an amplifier since the transmission loss is, in principle, large.

Proc. of OFC/NFOEC 2008, OWU2 (2008) and Opt. Express, 13, p. 3477-3490 (2005) disclose methods in which a high-order mode is removed by combining only the high-order mode to the periphery of the core of a fiber so as to substantially realize single mode propagation.

These methods can effectively remove the high-order mode, but the refractive index distribution and the structure are extremely complicated such that there is a demand for an extremely sophisticated control.

Therefore, there are problems in that manufacturing is difficult, the costs are high, the yield is low, and the like.

By the way, in recent years, a photonic band gap fiber which is based on a different optical propagation mechanism from those of optical fibers of the related art has been attracting attention as an optical fiber suitable for high-output fiber lasers or fiber amplifiers.

The photonic band gap fiber has a structure in which, basically, the Bragg reflection of light is used, and a plurality of fine high refractive index scatterers are disposed in cladding areas in the periphery of the core area formed of a material having a low refractive index so as to have a periodic structure.

In addition, it is possible to use a photonic band gap (PBG) with respect to out-of-plane propagation light formed by the periodic structure of the high refractive index portions in the cladding areas by having the above structure, and it is possible to confine optical waves to the core area (low refractive index portion) which is a defect portion with respect to the periodic structure and to propagate light in the longitudinal direction of the fiber.

Furthermore, a solid photonic band gap fiber with which the photonic band gap fiber can be manufactured in a solid structure is being developed (for example, refer to Proc. of SPIE vol. 5335, p. 132-139 (2004)).

The solid photonic band gap fiber has a structure in which, on a cross-section perpendicular to the longitudinal direction, basically, the core area is disposed in the central portion, the cladding areas are disposed so as to surround the core area, and the high refractive index portions are disposed in the cladding areas so as to surround the core area and have a lamellar periodic structure.

In addition, in the solid photonic band gap fiber, the core area is formed of a solid substance having a relatively low refractive index (generally, silica glass is used), the base portions of the cladding areas are formed of the same solid substance having a relatively low refractive index as for the core area (generally, silica glass is used), and the high refractive index portions are formed of a plurality of fine high refractive index scatterers (generally, a material obtained by doping a refractive index-increasing substance in silica glass is used).

Even for the solid photonic band gap fiber, the effective core cross-sectional area is studied in, for example, Opt. Express, 16, p. 11735-11740 (2008) and the like.

In Opt. Express, 16, p. 11735-11740 (2008), a result is reported that single mode propagation can be realized in a case that the mode field diameter (MFD), which is the same index as the effective core cross-sectional area, is 19 µm to 20 µm in the solid photonic band gap fiber.

However, it is reported that, in when an attempt is made to manufacture an effective core cross-sectional area in which MFD is 19 µm to 20 µm, it is difficult to realize single mode propagation through high-order mode propagation (refer to The Institute of Electronics, Information and Communication Engineers, Proceedings of the IEICE Society conference, BS-7-8 (2009)).

Furthermore, it is reported that, in the structure of the photonic band gap fiber disclosed in The Institute of Electronics, Information and Communication Engineers, Proceedings of the IEICE Society conference, BS-7-8 (2009), the bending loss of the fundamental mode is large, and it is difficult to bend the fiber in a compact size and to use the fiber.

Also, none of Proc. of SPIE vol. 5335, p. 132-139 (2004), Opt. Express, 14, p. 69-81 (2006), Opt. Lett., vol. 25, p. 442-444 (2000), Proc. of OFC/NFOEC 2008, OTuJ2 (2008), Opt. Express, 14, p. 2715-2720 (2006), Proc. of ECOC 2008, Th. 3.C. 1 (2008), Proc. of CLEO/QELS 2008, CPDB6 (2008), Proc. of OFC/NFOEC 2008, OWU2 (2008), and Opt. Express, 13, p. 3477-3490 (2005) disclose photonic band gap fibers, particularly, solid photonic band gap fibers which are the subject of the invention, but disclose optical fibers having different propagation methods.

Basically, when the propagation methods of light are different as described above, even when the methods described in above Non-Patent Documents are effective for optical fibers, it is not always true that the methods are effective in a case that the methods are applied to a photonic band gap fiber, particularly the solid photonic band gap fibers which are the subject of the invention.

As described above, in techniques of the related art, enlargement of the effective core cross-sectional area and realization of single mode propagation through removal of a high-order mode are conflicting objects, that is, objects on a tradeoff relationship, and these objects have not yet been achieved even in, particularly, the solid photonic band gap fiber.

Since the invention has been made in consideration of the above circumstances, an object of the invention is to provide a solid photonic band gap fiber, that is, an optical fiber in which high-order mode propagation is effectively inhibited so as to substantially maintain single mode propagation and enlarge the effective core cross-sectional area in a microstructure fiber in which fine high refractive index scatterers are disposed in a dispersed manner in cladding portions, and light is transmitted using a photonic band gap, a fiber module using the solid photonic band gap fiber, furthermore, a fiber amplifier, and a fiber laser.

SUMMARY

The present inventors found that the difference in the bending loss between a high-order mode and a fundamental mode is large in solid photonic band gap fibers.

In addition, the inventors found that, when the difference in the bending loss is actively used, it is possible to remove a high-order mode using the bending loss and substantially propagate only the fundamental mode in the core by holding the solid photonic band gap fiber at an appropriate bending radius, and, in this case, the effective core cross-sectional area can be enlarged, and to achieve the invention.

A solid photonic band gap fiber according to a first aspect of the invention has a core area located at a central portion of a cross-section with respect to a longitudinal direction of the fiber, the core area being formed of a solid substance having a low refractive index; cladding areas having base portions formed of a solid substance having a low refractive index, the cladding areas surrounding the core area; and a plurality of fine high refractive index scatterers provided in the cladding areas, and disposed in a dispersed manner so as to surround the core area, the number of fine high refractive index scatterers being formed of a solid substance having a high refractive index.

Furthermore, in a state that the solid photonic band gap fiber is held at a predetermined bending radius, propagation in a high-order mode is suppressed by using a difference in a bending loss between a fundamental mode and the high-order mode, and only the fundamental mode is substantially propagated, the fundamental mode and the high-order mode being caused by bending.

A solid photonic band gap fiber according to a second aspect of the invention is the solid photonic band gap fiber of the first aspect, in which the high refractive index scatterers are disposed so as to have a lamellar periodic structure in the cladding areas surrounding the core area.

A solid photonic band gap fiber according to a third aspect of the invention is the solid photonic band gap fiber of the second aspect, in which the high refractive index scatterers are periodically disposed in a triangular grid shape in the cladding areas surrounding the core area, at least four or more layers of the high refractive index scatterers in the periodic structure are provided in a radius direction of the fiber.

In addition, when the high refractive index scatterers are assumed to be periodically disposed in a triangular grid shape toward a radial-outer direction from a central location of a transverse cross-section of the fiber, the core area has an area that corresponds to an area in which two or more layers of the high refractive index scatterers are removed from the central location of the transverse cross-section of the fiber.

A solid photonic band gap fiber according to a fourth aspect of the invention is the solid photonic band gap fiber of any one of the first to third aspects, in which the core area and the base portions of the cladding areas are constituted by a substance mainly including silica glass, and the high refractive index scatterers are constituted by silica glass to which germanium is added.

A solid photonic band gap fiber according to a fifth aspect of the invention is the solid photonic band gap fiber of any one of the first to fourth aspects, in which the bending loss of the fundamental mode in a state that the solid photonic band gap fiber is held at the predetermined bending radius is 0.1 dB/m or less, and the bending loss of the high-order mode is 3 dB/m or more.

A solid photonic band gap fiber according to a sixth aspect of the invention is the solid photonic band gap fiber of any one of the first to fifth aspects, in which the effective core cross-sectional area at the predetermined bending radius is 200 $\mu m^2$ or more.

A solid photonic band gap fiber according to a seventh aspect of the invention is the solid photonic band gap fiber of any one of the first to sixth aspects, in which the operating waveband is set in a first permeation band of the solid photonic band gap fiber.

A solid photonic band gap fiber according to an eighth aspect of the invention is the solid photonic band gap fiber of the third aspect, in which the predetermined bending radius is held in a range of 40 mm to 200 mm.

A solid photonic band gap fiber according to a ninth aspect of the invention is the solid photonic band gap fiber of the third aspect, in which the triangular grid-shaped periodic gap between the high refractive index scatterers is in a range of 8 $\mu m$ to 16 $\mu m$, and the relative refractive index difference between the high refractive index scatterers and the base portions of the cladding areas is in a range of 1.0% to 3.0%.

A solid photonic band gap fiber according to a tenth aspect of the invention is the solid photonic band gap fiber of the ninth aspect, in which the effective core cross-sectional area at the predetermined bending radius is 300 $\mu m^2$ or more.

A solid photonic band gap fiber according to an eleventh aspect of the invention is the solid photonic band gap fiber of the third aspect, in which the triangular grid-shaped periodic gap between the high refractive index scatterers is in a range of 10 $\mu m$ to 16 $\mu m$, and the relative refractive index difference between the high refractive index scatterers and the parent material of the cladding areas is in a range of 1.3% to 3.0%.

A solid photonic band gap fiber according to a twelfth aspect of the invention is the solid photonic band gap fiber of the eleventh aspect, in which the predetermined bending radius is in a range of 90 mm to 200 mm, and the effective core cross-sectional area at the predetermined bending radius is 450 $\mu m^2$ or more.

A solid photonic band gap fiber according to a thirteenth aspect of the invention is the solid photonic band gap fiber of the third aspect, in which the triangular grid-shaped periodic gap between the high refractive index scatterers is in a range of 8 $\mu m$ to 11 $\mu m$, and the relative refractive index difference between the high refractive index scatterers and the base portions of the cladding areas is in a range of 1.5% to 3.0%.

A solid photonic band gap fiber according to a fourteenth aspect of the invention is the solid photonic band gap fiber of the thirteenth aspect, in which the predetermined bending radius is in a range of 40 mm to 90 mm, and the effective core cross-sectional area at the predetermined bending radius is 350 $\mu m^2$ or more.

A solid photonic band gap fiber according to a fifteenth aspect of the invention is the solid photonic band gap fiber of any one of the sixth to fourteenth aspects, in which the bending loss of the fundamental mode is 0.1 dB/m or less, and the bending loss of the high-order mode is 10 dB/m or more by holding the bending radius in a range of 40 mm to 200 mm.

A solid photonic band gap fiber according to a sixteenth aspect of the invention is the solid photonic band gap fiber of any one of the seventh to fourteenth aspects, in which a normalized frequency V is used at a wavelength in a range of 1.2 to 2.0.

A solid photonic band gap fiber according to a seventeenth aspect of the invention is the solid photonic band gap fiber of any one of the first to sixteenth aspects including an outside cladding layer having a low refractive index, the outside cladding layer being provided at the outside of the cladding areas.

A solid photonic band gap fiber according to an eighteenth aspect of the invention is the solid photonic band gap fiber of the seventeenth aspect, in which the outside cladding layer is formed of a polymer cladding.

A solid photonic band gap fiber according to a nineteenth aspect of the invention is the solid photonic band gap fiber of the seventeenth aspect, in which the outside cladding layer is formed of an air cladding or a holey cladding.

A solid photonic band gap fiber according to a twentieth aspect of the invention is the solid photonic band gap fiber of any one of the first to nineteenth aspects, in which the core area includes a fluorescent element.

A solid photonic band gap fiber according to a twenty first aspect of the invention is the solid photonic band gap fiber of the twentieth aspect, in which the fluorescent element is a rare earth element.

A solid photonic band gap fiber according to a twenty second aspect of the invention is the solid photonic band gap fiber of the twenty first aspect, in which the rare earth fluorescent element is ytterbium.

In an optical fiber module according to a twenty third aspect of the invention, at least some of the solid photonic band gap fiber of any one of the first to twenty second aspects is held at a predetermined bending radius.

In an optical fiber module according to a twenty fourth aspect of the invention, the solid photonic band gap fiber of any one of the first to twenty second aspects is wound at a predetermined radius into a coil shape.

A fiber laser or a fiber amplifier according to a twenty fifth aspect of the invention includes the solid photonic band gap fiber or the optical fiber module of any one of the first to twenty second aspects as a component.

According to the aspect of the invention, the effective core cross-sectional area can be enlarged as a solid photonic band gap fiber, and, furthermore, it is possible to substantially maintain single mode propagation by effectively inhibiting high-order mode propagation while the solid photonic band gap fiber has the enlarged effective core cross-sectional area.

Therefore, it becomes actually possible to realize a fiber laser and amplifier having high beam qualities and a high output.

Furthermore, in the solid photonic band gap fiber of the aspect of the invention, it is possible to substantially maintain single mode propagation at as a large effective core cross-sectional area as described above by using the solid photonic band gap fiber in a bent state, therefore, it becomes possible to use the solid photonic band gap fiber as, for example, a compact fiber module bent into a coil shape, and it becomes possible to realize a fiber laser and a fiber amplifier which are not only compact but also have high beam qualities and a high output.

DETAILED DESCRIPTION OF THE PREFERRED EMBODIMENTS

Figure 1:
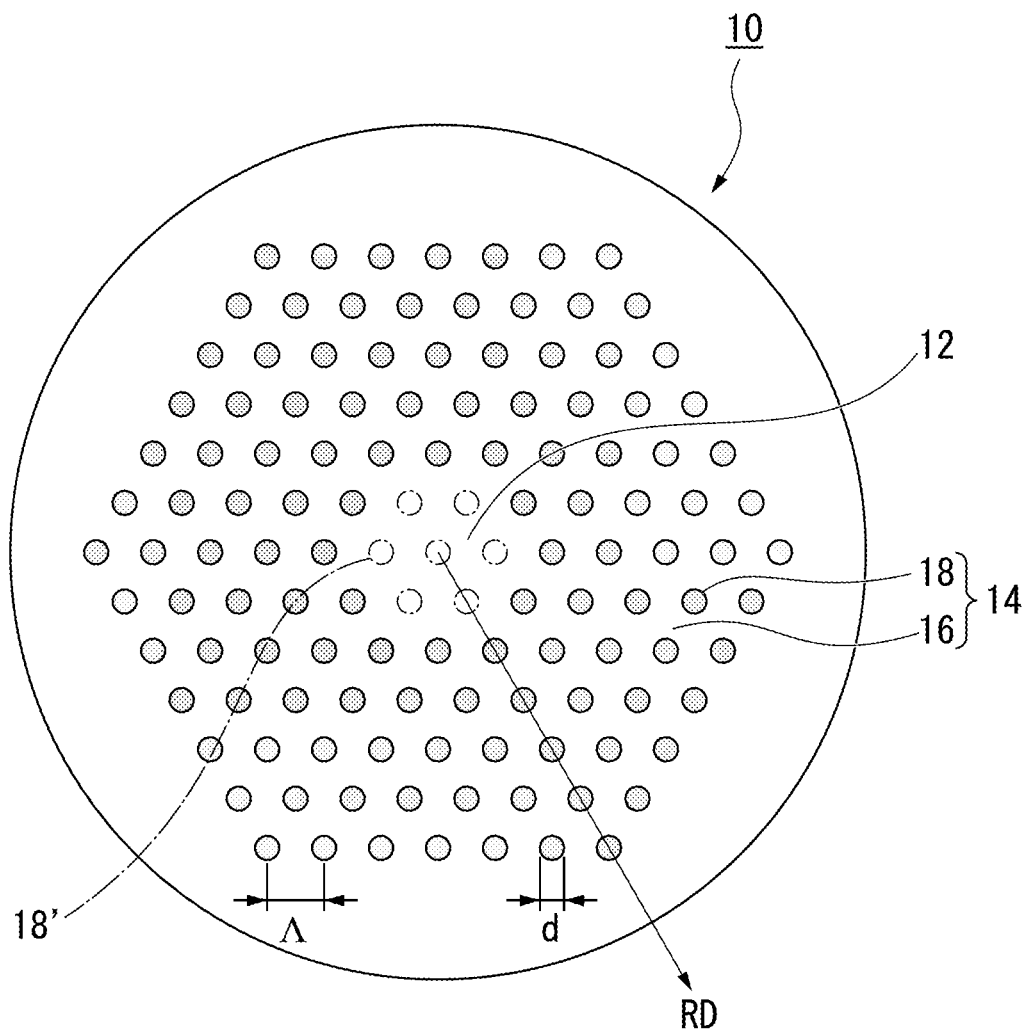
FIG. 1 is a schematic view of a transverse cross-section perpendicular to the longitudinal direction of the solid photonic band gap fiber of the invention, which shows the basic structure of the solid photonic band gap fiber of the invention.

Hereinafter, the basic elements of the invention and embodiments of the invention will be described in detail with reference to the accompanying drawings.

Firstly, the basic technical elements of the invention will be described.

A solid photonic band gap fiber has a waveguide structure (termed an ARROW-type waveguide path) in which light is confined in a core area by blocking leakage of light in a certain wavelength range outside the core area using antiresonant reflection.

In the ARROW-type waveguide path, a low refractive index core can be realized, and it is possible to realize optical characteristics which cannot be realized in an ordinary refractive index waveguide-type fiber.

In addition, in the invention, a high-order mode is removed through bending loss by making the solid photonic band gap fiber have an appropriate bending radius using a large difference in the bending loss between the high-order mode and the fundamental mode in a solid photonic band gap fiber, thereby realizing substantial propagation of the fundamental mode alone in the core.

Here, characteristics required for an optical fiber in which the effective core cross-sectional area is enlarged, and a single mode operation can be substantially exhibited will be described.

For optical fibers, there is a demand for a decrease in the loss of propagated light as well as enlargement of the effective core cross-sectional area and a single mode operation.

The loss herein includes material loss, confinement loss, and bending loss.

In the invention, the mode for which a decrease in loss is required is a mode that is wished to be propagated, that is, the fundamental mode alone.

On the other hand, for the high-order mode, there is a demand for, conversely, an increase in loss.

In addition, the fiber is hopefully applied to fiber lasers and fiber amplifiers, and, in a case that a situation in which the fiber laser or fiber amplifier is used is assumed, the fiber is desirably coiled into a module which can be stored compactly.

Regarding the above requirement, there are a variety of tradeoffs.

It is considered that it is effective to increase the difference between the effective refractive index (propagation constant) of the fundamental mode at an operation wavelength and the lower limit (the lower limit of the effective refractive index (propagation constant) at which propagation inhibition in an in-plane direction can be maintained) of the effective refractive index of the in-plane direction propagation inhibition band (band gap) at the operation wavelength in order to decrease the confinement loss in the solid photonic band gap fiber.

However, since propagation of the high-order mode is permitted by increasing the difference, there is a limitation in terms of design in enlarging the effective core cross-sectional area while maintaining single mode propagation.

Therefore, the invention provides a fiber in which, even under conditions in which the difference between the effective refractive index of the fundamental mode and the lower limit of the effective refractive index of the propagation inhibition band in the in-plane direction is large, and the high-order mode is present, the high-order mode is actively leaked using the bending loss of the high-order mode, and, consequently, single mode propagation can be substantially realized.

Here, the basic structure of the solid photonic band gap fiber of the invention will be described with reference to FIG. 1, and the number of layers of a core area and high refractive index scatterers will be displayed.

FIG. 1 shows an example of the basic structure of a solid photonic band gap fiber 10 of the invention.

FIG. 1 shows a cross-section perpendicular to the longitudinal direction of the fiber, and the solid photonic band gap fiber 10 has a structure in which a core area 12 is located at the central portion, cladding areas 14 are disposed so as to surround the core area 12, and a plurality of fine high refractive index scatterers 18 are disposed in a dispersed manner in the cladding areas 14 so as to surround the core area 12 (in the example of FIG. 1, high refractive index scatterers 18 are disposed in a lamellar shape in a periodic structure in a state in which triangular grid shapes are closely packed).

In addition, in the solid photonic band gap fiber 10, the core area 12 is formed of a solid substance having a low refractive index (hereinafter the refractive index will be expressed as $n_{low}$), the base portions 16 of the cladding areas 14 are formed of a solid substance having a low refractive index (the refractive index is the same as the refractive index $n_{low}$ of the ordinary core area 12), and a plurality of the fine high refractive index scatterers 18 are formed of a solid substance having a high refractive index (hereinafter the refractive index will be expressed as $n_{high}$) in the cladding area 14.

Here, regarding the size of the core area 12 (the width on the transverse cross-sectional surface of the fiber), it is assumed that the high refractive index scatterers 18 are disposed in a periodic structure in a state in which triangular grid shapes are closes packed outward from the central location of the fiber 10 in the radius direction of the fiber, in this case, the core area 12 is considered to be formed by removing n layers from the center and m pieces (m cells) of high refractive index scatterers 18', and the size of the core area 12 is indicated using the number of the removed layers n or the number of the removed cells m.

Therefore, in the example of FIG. 1, the area from which two layers and seven cells of the high refractive index scatterers 18' in the central portion indicated by the imaginary line is considered to be the core area 12, and the size of the core area 12 can be indicated using a two-layer equivalent portion or a seven-cell equivalent portion.

Meanwhile, the number of the layers of the high refractive index scatterers 18 in the cladding areas 14 is indicated, similarly to the above, using the number of the high refractive index scatterers 18 which are periodically arrayed in the radius direction RD from the center of the transverse cross section of the fiber in a case that the high refractive index scatterers are disposed in a periodic structure in a state in which triangular grid shapes are closely packed.

Therefore, in the example of FIG. 1, the high refractive index scatterers 18 in the cladding areas 14 correspond to five layers.

Also, as described above, the size of the core area 12 is indicated not by an absolute dimension but by the number of layers or number of cells of the high refractive index scatterers removed from the central location with an assumption that the high refractive index scatterers 18 are disposed in a periodic structure in a state in which triangular grid shapes are closely packed.

The reason is that, in the solid photonic band gap fiber, which is an assumption of the invention, since a photonic band gap is used, the relative size of the core area with respect to the disposition status of the high refractive index scatterers has an influence on characteristics, and the absolute dimension of the core area does not have an influence on characteristics.

However, in general, the size of the core area is approximately 10 μm to 50 μm to in the diameter on the cross-section of the fiber, and, for example, since the core area which has a periodic gap of 12 μm and is equivalent to two layers corresponds to the diameter of three layers, the size of the core area is approximately 36 μm in diameter.

In addition, for example, as shown in FIG. 1, for the high refractive index scatterers 18 in the cladding areas 14, the gap between the centers of two most closely adjacent high refractive index scatterers is termed the gap between the high refractive index scatterers.

In addition, particularly, the gap between the centers of adjacent high refractive index scatterers in a case that the high refractive index scatterers 18 are disposed in a periodic structure in a state in which triangular grid shapes are closely packed is termed the periodic gap (of the triangular grid), and the periodic gap is indicated using Λ (lambda).

Furthermore, the diameter of the high refractive index scatterer 18 in the transverse cross-sectional surface of the fiber is indicated using d.

With the above assumptions, the invention will be described more specifically.

In the invention, a concept indicated using the normalized frequency V (different from the normalized frequency used in a refractive index waveguide path) is introduced, and the normalized frequency V will be described with reference to a first example of the solid photonic band gap fiber of the invention shown in FIG. 2.

Figure 2:
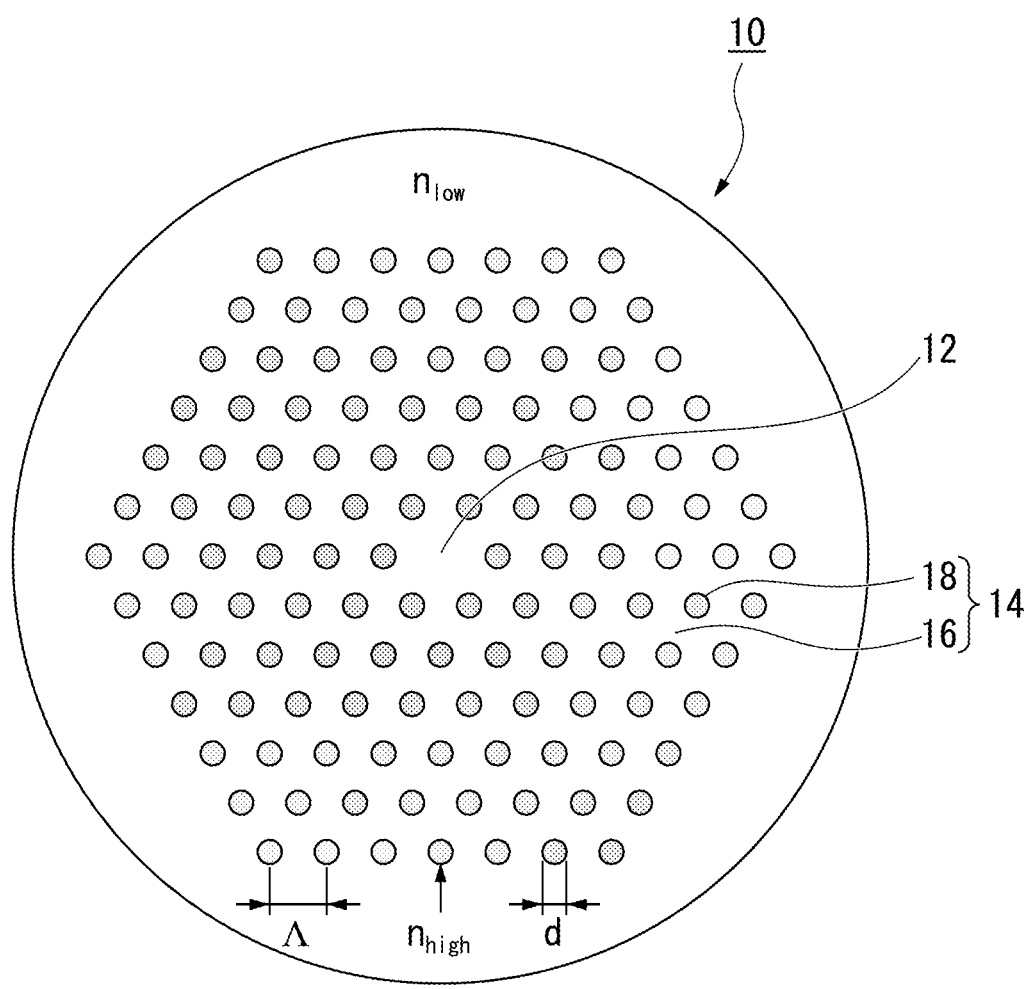
FIG. 2 is a schematic cross-sectional view of a single cell-structured (single layer core-structured) solid photonic band gap fiber which is a first example of the solid photonic band gap fiber of the invention.

In the first example of the solid photonic band gap fiber 10 shown in the transverse cross-sectional surface in FIG. 2, the core area 12 is one layer (one cell), and the high refractive index scatterers 18 in the cladding areas 14 are periodically disposed in six layers in a triangular grid shape.

Thus far, generally, the band gap structure or the confinement loss has been frequently discussed with a fixed d/Λ and diverse wavelengths in the photonic band gap fiber, however, with the above method, it is difficult to uniformly and fairly evaluate a variety of parameters.

As a result, the inventors introduce a concept indicated using a normalized frequency V represented by the following formula (2).

[Formula 2]

$$V = \frac{\pi}{\lambda} d \sqrt{n_{high}^2 - n_{low}^2} \quad (2)$$

Using the above formula, a fixed operation wavelength λ, and diverse d, $n_{high}$, and Λ, under what relationship among the above conditions the structure can achieve the basic object (maintenance of a low loss, and achievement of both single mode propagation and enlargement of the effective core cross-sectional area) of the invention is studied in the first example of the solid photonic band gap fiber 10 shown in FIG. 2.

The results will be subsequently described with reference to FIGS. 3 and 4.

Figure 3:
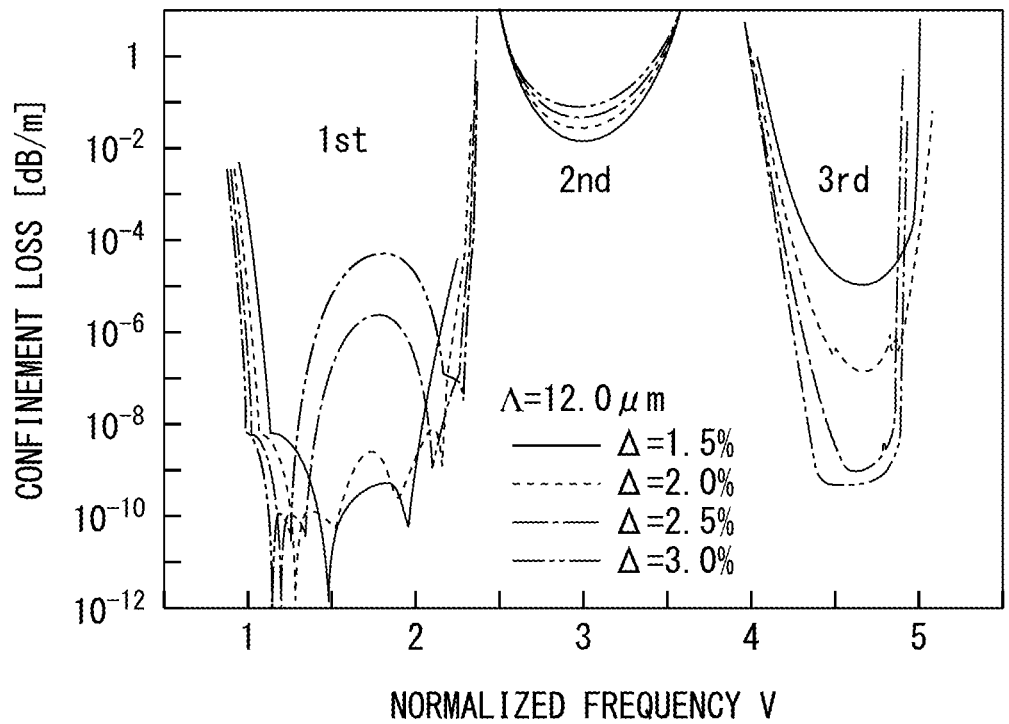
FIG. 3 is a diagrammatic view exemplifying the relationship between the confinement loss of the fundamental mode and the normalized frequency V in the solid photonic band gap fiber shown in FIG. 1, which is obtained through computation, when the gap $\Lambda$ between high refractive-index scatterers is 12.0 μm.

FIG. 3 shows the relationship between the confinement loss of the fundamental mode and the normalized frequency V which is obtained through computation.

Here, the computation results are shown in a case that the solid photonic band gap fiber 10 has a single cell structure, Λ is fixed at 12.0 μm, and several conditions of the relative refractive index difference (Δ) are used.

Here, the relative refractive index difference is specified using the following formula (3).

Meanwhile, in the formula (3), $n_{high}$ represents the refractive index of the high refractive index scatterers as described above, $n_{low}$ represents the refractive index of the base portion (in the present computation, the computation is carried out when the core portion and the base portions of the cladding portions have the same refractive index) of the cladding portion, and, the approximation formula on the right side of the formula (3) is satisfied when the difference between $n_{high}$ and $n_{low}$ is small.

Meanwhile, the computation wavelength λ, is 1064 nm.

[Formula 3]

$$\Delta = \frac{n_{high}^2 - n_{low}^2}{2n_{high}^2} \cong \frac{n_{high} - n_{low}}{n_{high}} \cong \frac{n_{high} - n_{low}}{n_{low}} \quad (3)$$

In FIG. 3, the area indicated by 1st shows a first band gap (first permeation band) in the photonic band gap structure, the area indicated by 2nd shows a second band gap (second permeation band) in the photonic band gap structure, and the area indicated by 3rd shows a third band gap (third permeation band) in the photonic band gap structure.

It can be understood from FIG. 3 that, since the V value is introduced, losses in the respective band gaps may be evaluated in a manner in which the loss is evaluated at V=1.6 which is the central wavelength of the band gap for the first band gap (1st), and, similarly to the case of the first band gap, the loss is evaluated at V=4.65 which is the central wavelength of the band gap for the third band gap (3rd).

In the example in FIG. 3, it is found that the confinement loss decreases as Δ decreases in the first band gap (V=1.6) and as Δ increases in the third band gap (V=4.65).

In addition, it is found that the confinement loss is large in the second band gap in any structures, and the second band gap is not suitable for practical use.

Next, the bending loss will be considered.

Figure 4:
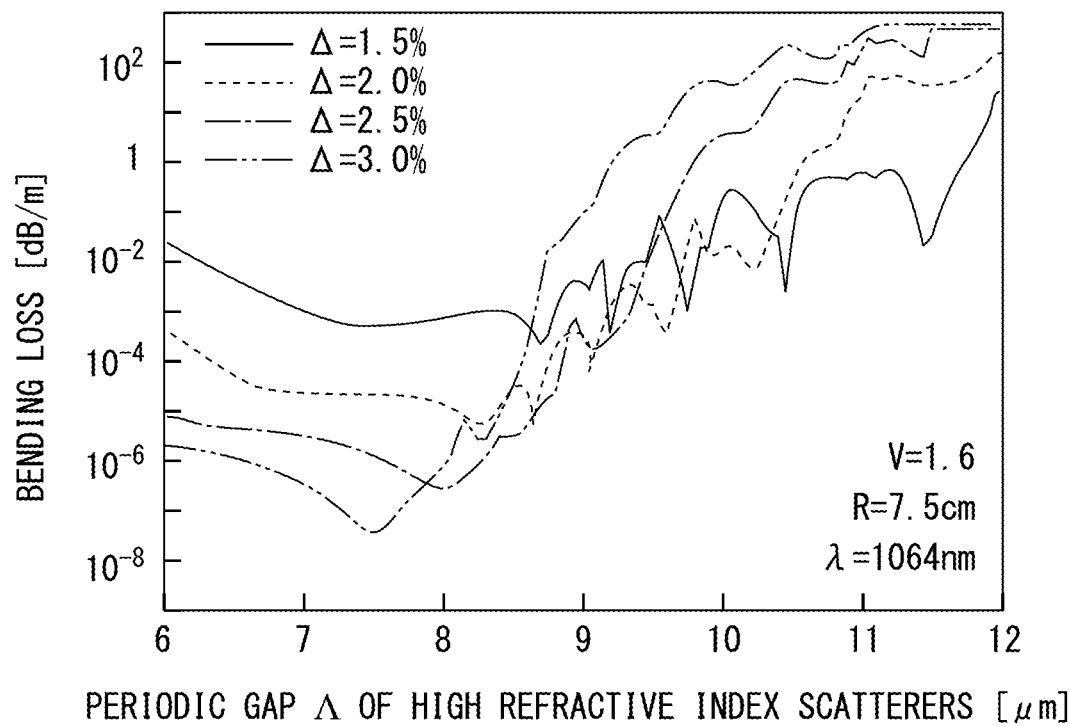
FIG. 4 is a diagrammatic view showing the dependency of the bending loss of the fundamental mode on the gap $\Lambda$ between high refractive-index scatterers in a first band gap of the solid photonic band gap fiber shown in FIG. 1 when the bending radius is 75 mm.

FIG. 4 shows the dependency of the bending loss of the fundamental mode on Λ between in the first band gap of the photonic band gap fiber having a single cell core structure shown in FIG. 2 when the bending radius R is 75 mm.

Additionally, the computation wavelength λ is 1064 nm, and the computation results in a case that several conditions of the relative refractive index difference (Δ) are used are shown.

It is found from FIG. 4 that, in a case that the bending loss of the fundamental mode is suppressed to 0.1 dB/m or less, the upper limit of Λ is limited to approximately 9 μm to 9.5 μm even when any Δ is used.

At this time, the effective core cross-sectional area is 200 μm² or less, and, in the photonic band gap fiber having the single cell core structure, it is proposed that it is difficult to obtain characteristics exceeding other methods (for example, a refractive index waveguide-type fiber: refer to Proc. of OFC/NFOEC 2008, OTuJ2 (2008) and the like) in terms of enlargement of the effective core cross-sectional area.

Figure 5:
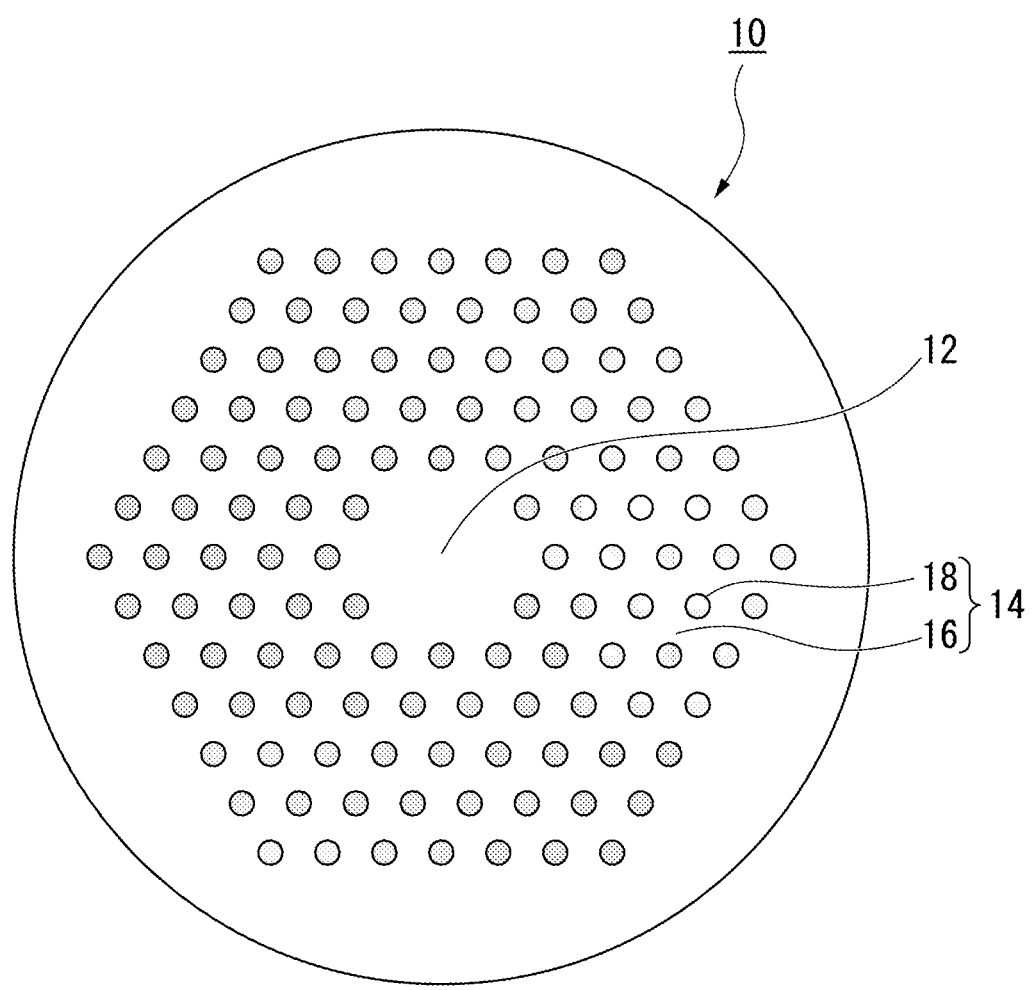
FIG. 5 is a schematic cross-sectional view of a seven-cell-structured (two-layer core-structured) solid photonic band gap fiber which is a second example of the solid photonic band gap fiber of the invention.

FIG. 5 shows the transverse cross-section of a second example of the solid photonic band gap fiber 10.

The solid photonic band gap fiber 10 of the second example has a structure in which the core area 12 is two layers (seven cells), that is, a core structure from which two layers of high refractive index scatterers in the center are removed, and five layers of the high refractive index scatterers 18 in the cladding areas 14 are periodically disposed in a triangular grid shape.

Figure 6:
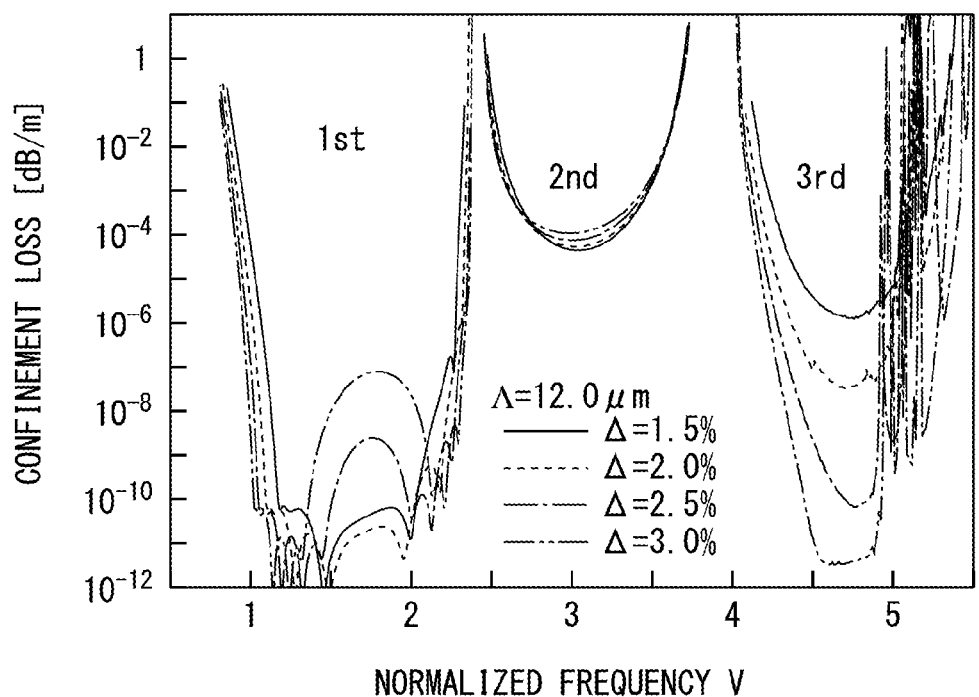
FIG. 6 is a diagrammatic view exemplifying the relationship between the confinement loss of the fundamental mode and the normalized frequency V in the solid photonic band gap fiber shown in FIG. 5, which is obtained through computation, when the gap $\Lambda$ between high refractive-index scatterers is 12.0 μm.
Figure 7:
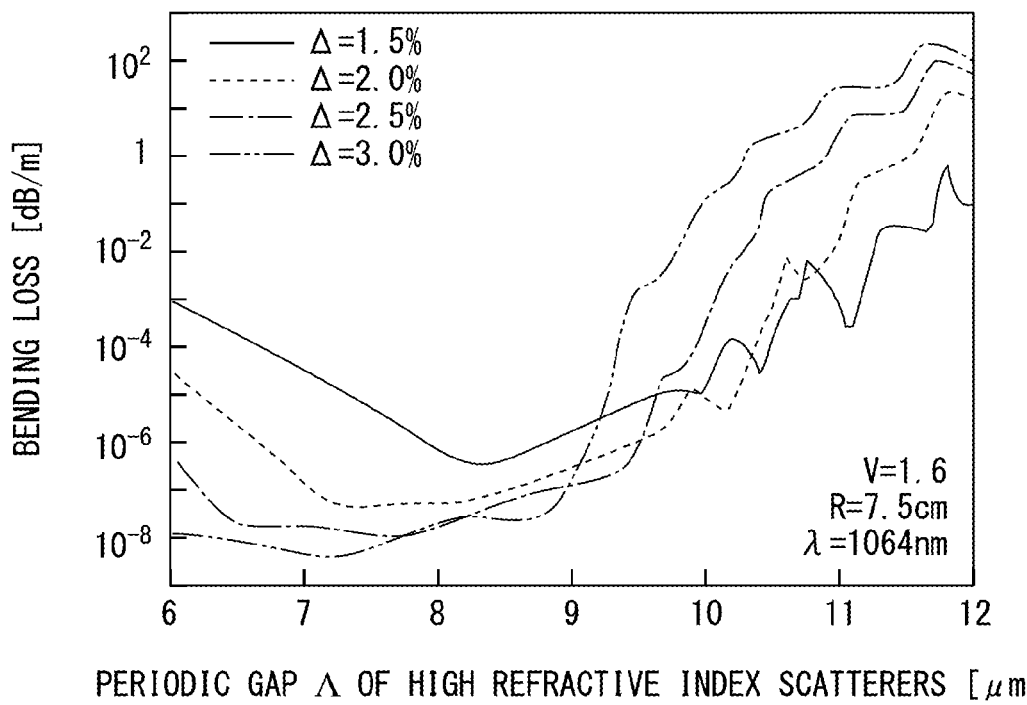
FIG. 7 is a diagrammatic view showing the dependency of the bending loss of the fundamental mode on the gap $\Lambda$ between high refractive-index scatterers in a first band gap of the solid photonic band gap fiber shown in FIG. 5 when the bending radius is 75 mm.

For a photonic band gap fiber having a seven-cell (two-layer) core structure as shown in FIG. 5, the results computed in the same manner as above will be shown in FIGS. 6 and 7.

FIG. 6 shows the relationship (the computation wavelength $\lambda$ is 1064 nm) between the confinement loss (leakage loss) of the fundamental mode and the normalized frequency V, which is obtained through computation, when $\Lambda$ is 12 μm.

In addition, FIG. 7 shows the dependency (at a wavelength of 1064 nm) of the bending loss of the fundamental mode on $\Lambda$ when the bending radius is 75 mm in the first band gap (1st, V=1.6).

It is found from FIG. 7 that, when the bending loss of the fundamental mode is suppressed to 0.1 dB/m or less, $\Lambda$ of 9 μm or more can be secured in a case that any $\Delta$ is used, and $\Delta$ can be further increased in a case that $\Delta$ is low.

Here, it is found that, unlike the case of the single cell core structure (FIGS. 2 to 4), in the case of the seven-cell core structure, since a core diameter of 3 $\Lambda$ or more can be secured, in this case, an effective core cross-sectional area of 300 μm$^2$ can be secured, and a fiber for which the effective core cross-sectional area is sufficiently enlarged can be realized.

Here, the subject of the invention is a fiber for which the difference between the refractive index of the fundamental mode and the lower limit of the effective refractive index of the propagation inhibition band in the in-plane direction is increased.

Therefore, in order to substantially realize single mode propagation, the bending loss of the high-order mode needs to be sufficiently large in the above fiber structure.

Figure 8:
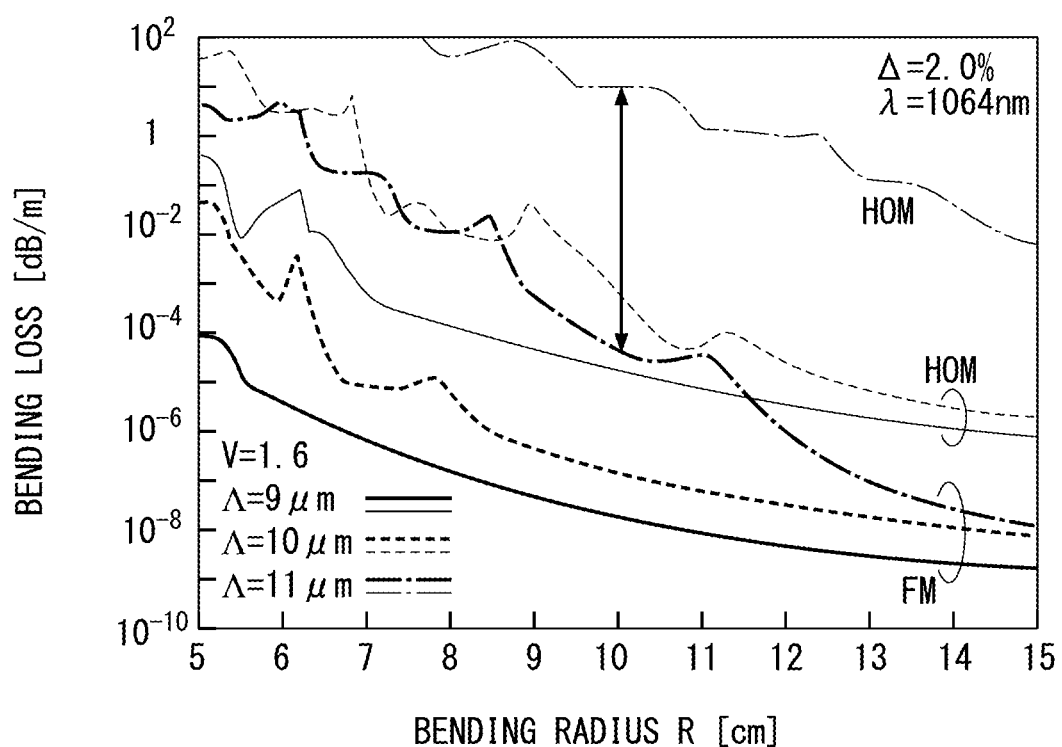
FIG. 8 is a diagrammatic view showing the dependency of the fundamental mode and the high-order mode on the bending radius R of the bending loss in the first band gap of the solid photonic band gap fiber shown in FIG. 5 when the relative refractive index difference $\Delta$ is 2.0%.

FIG. 8 shows the results (computation wavelength $\lambda$ is 1064 nm) of the dependency of the fundamental mode and the high-order mode on the bending radius of the bending loss when $\Delta$ is 2.0% which is computed in a case that several conditions of $\Lambda$ are used.

Also, in FIG. 8, FM represents the bending loss of the fundamental mode, and HOM represents the bending loss of the high-order mode.

As is clear from FIG. 8, for example, when the bending radius is 100 mm, even when $\Lambda$ is as large as 11 μm, a bending loss of 0.1 dB/m or less (approximately 10$^{-4}$ dB/m) can be secured in the fundamental mode (FM), and a bending loss of 3 dB/m or less (approximately 10 dB/m) can be secured in the high-order mode (HOM).

Under these conditions, substantial single mode propagation is possible.

From the above, it is possible to store a fiber in a compactly bent state and to manufacture a fiber which has a large effective core cross-sectional area and enables substantial single mode propagation through an appropriate design, which could not be realized using a fiber structure and a design of the related art.

Next, a material used for the photonic band gap fiber of the invention will be described.

Basically, the material that configures the low refractive index portion (the parent material portion of the core area and the cladding areas) is not particularly limited as long as the relative refractive index difference between the material that configures the low refractive index portion and the material that configures the high refractive index scatterers can be appropriately secured, and the loss of light due to the material at the operation wavelength is small.

For example, plastic such as PMMA, fluoride glass, chalcogenide glass, multicomponent glass, bismuth glass, or the like may be used.

Particularly, as the material that configures the low refractive index portion, silica glass is most appropriate from the viewpoint of the controllability of material loss or the refractive index, and the like.

In addition, for the purpose of amplification of light, it is also possible to form the core area for which a small amount (generally, 5 mol % or less of the total amount in terms of an oxide) of a fluorescent element (an element that emits fluorescent light when added to silica glass), for example, a rare earth element, bismuth, cobalt, nickel, chromium, or the like is added to silica glass, and, in this case, among the above elements, a rare earth element, particularly, ytterbium which is a rare earth element is most appropriate.

In addition, the low refractive index portions (the base portions) of the cladding areas and the core area do not necessarily need to be formed of the same material and to have the same concentration of substances added.

The fluorescent element may be doped only into the core area, and the refractive indexes of the core area and the base portions of the cladding areas may be somewhat different.

In addition, a refractive index distribution may be provided in the core area, but there is a demand that the difference between the refractive index of the high refractive index scatterers and the refractive index of the low refractive index portions (the base portions) of the cladding areas and the core area is sufficiently larger than the difference in the refractive index between the core area and the base portions of the cladding areas.

Generally, when the difference between the refractive index of the core area and the refractive index of the base portions of the cladding areas is 20% or less of the difference between the refractive index of the high refractive index scatterers and the refractive index of the core area and the refractive index of the low refractive index portions (the base portions) of the cladding areas, the above condition is considered to be satisfied.

On the other hand, for the high refractive index scatterers, basically, it is possible to use an arbitrary material such as silica glass to which phosphorous, titanium, aluminum, or the like is added as long as the refractive index is higher than those of the low refractive index portions (the base portions) of the cladding areas and the core area, and a desired relative refractive index difference can be realized.

Particularly, from the viewpoint of the controllability of loss or the refractive index, germanium-added silica glass is most appropriate as the material that configures the high refractive index scatterers.

In addition, in the solid photonic band gap fiber, a protective coating formed of for example, a urethane acrylate-based UV resin or the like may be coated on the outside (the outside of the cladding areas) as necessary, and outside claddings having a lower refractive index than the low refractive index portions (the base portions) of the cladding areas may be disposed on the outside of portions in the cladding areas in which the high refractive index scatterers are disposed.

The outside claddings are used in the scheme of a cladding pump or the like, and a polymer cladding, an air cladding, a poly cladding, or the like can be used as the material of the outside claddings.

The above three kinds of outside claddings are appropriate from the viewpoint of manufacturability and the like, and, particularly, a poly cladding is most appropriate.

Next, the disposition of the high refractive index scatterers will be described.

Unlike a photonic band gap fiber with a hollow core, in the solid photonic band gap fiber, the high refractive index scatterers do not necessarily need to be periodic.

Figure 9:
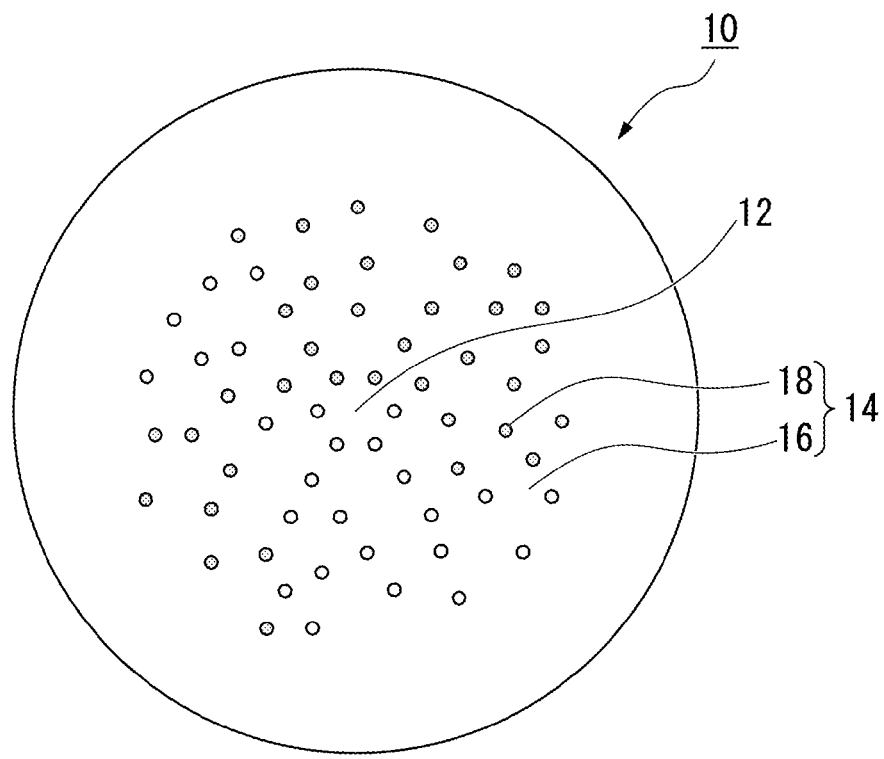
FIG. 9 is a schematic cross-sectional view of a third example of the solid photonic band gap fiber of the invention.
Figure 10:
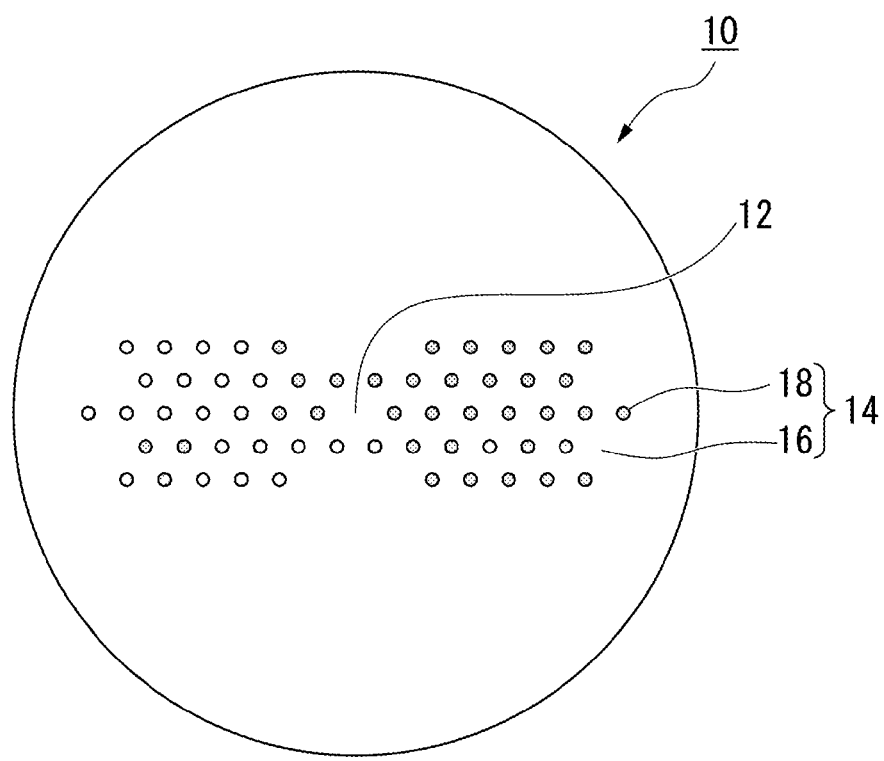
FIG. 10 is a schematic cross-sectional view of a fourth example of the solid photonic band gap fiber of the invention.

For example, even when the structures shown in FIGS. 9 and 10 are used, the effects of the invention can be exhibited as long as the structures are appropriately designed.

However, from the viewpoint of easy manufacturing, the high refractive index scatterers are desirably periodic.

Generally, the solid photonic band gap fiber is frequently manufactured using a stack-and-draw method, however, when the stack-and-draw method is considered, particularly, the high refractive index scatterers are most appropriately disposed periodically in a triangular grid shape.

Figure 11:
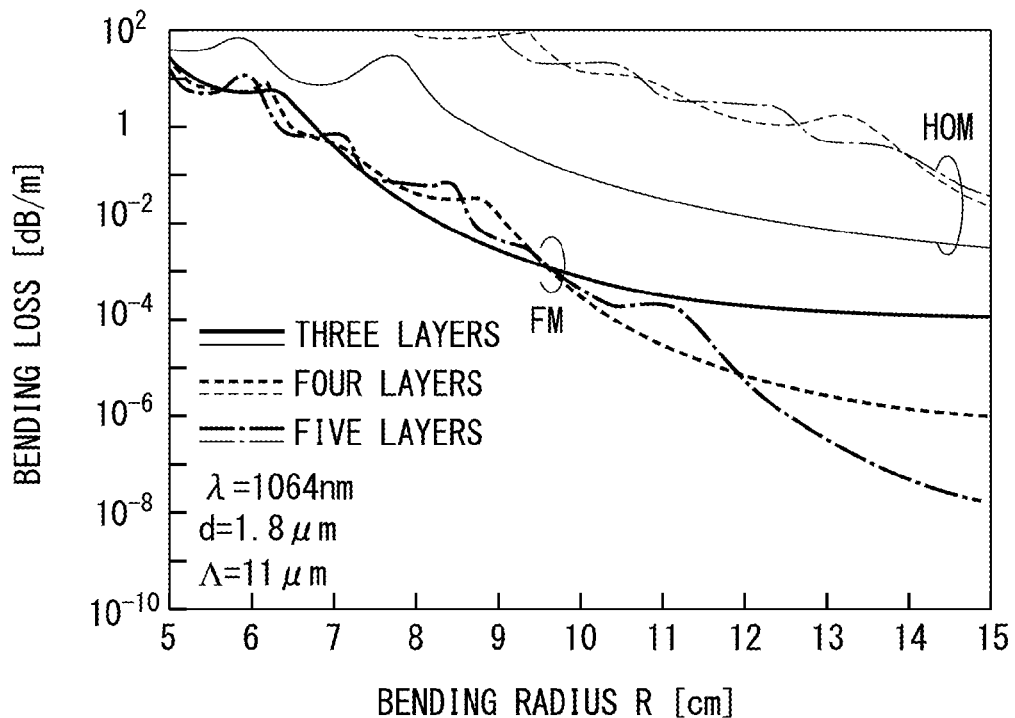
FIG. 11 is a diagrammatic view showing the dependency of the high refractive index scatterers on the number of layers using the relationship between the bending radius R and the bending loss in the solid photonic band gap fiber when the high refractive index scatterers are periodically disposed in a triangular grid shape.

FIG. 11 shows the dependency of bending loss on the number of layers of the high refractive index scatterers in a state in which a plurality of layers of the same high refractive index scatterers are periodically disposed in a triangular grid shape.

The bending loss of the fundamental mode (FM) is nearly independent of the number of layers.

On the other hand, regarding the bending loss of the high-order mode (HOM), when the number of layers of the high refractive index scatterers is three, the difference from the bending loss of the fundamental mode (FM) decreases.

Therefore, when the high refractive index scatterers are periodically disposed in a triangular grid shape, the number of layers of the high refractive index scatterers is desirably four or more.

Additionally, the diameter d of the high refractive index scatterer is, similarly to $n_{high}$, $n_{low}$, and the operation wavelength $\lambda$, a factor that has an influence on the normalized frequency V as shown in the above formula (2).

Therefore, the diameter of the high refractive index scatterer needs to be determined according to the above values so as to obtain a desired normalized frequency V, the specific dimension of the diameter d is not particularly limited, and is generally approximately 0.3 μm to 7 μm.

Regarding the structure of the core area, as described above, in a case that the structure is a single cell core structure, it is difficult to enlarge the effective core cross-sectional area, and a merit of using the structure of the invention is small.

On the other hand, the photonic band gap fiber having the seven-cell (two-layer) core structure from which two layers of the high refractive index scatterers in the center are removed can be stored in a bent state, has a large effective core cross-sectional area, and has a preferable configuration for realizing a fiber in which substantial single mode propagation is possible.

Needless to say, three or more layer core structures from which three or more layers of the high refractive index scatterers in the center are removed can be provided for practical use as long as appropriately designed.

Generally, the solid photonic band gap fiber has a plurality of band gaps (permeation bands), and it is necessary to understand the characteristics of the respective band gaps and to carefully select from the entire band gaps band gaps to be used to realize the target functions of the invention.

As described above, the second band gap has a large confinement loss, and is thus not practically available.

On the other hand, for the fourth or later band gaps, since it is necessary to make $\Lambda$ extremely small, and it is difficult to manufacture the band gaps, there is a disadvantage that the available wavelength band range is narrow.

Considering the above, the available band gap is the first band gap or the third band gap.

As shown in FIGS. 6 to 8, and 11, since the first band gap (1st) has characteristics of a low confinement loss, a low bending loss of the fundamental mode, and a high bending loss of the high-order mode, the first band gap is the most appropriate band gap.

Therefore, the first band gap is most desirably used.

Figure 12:
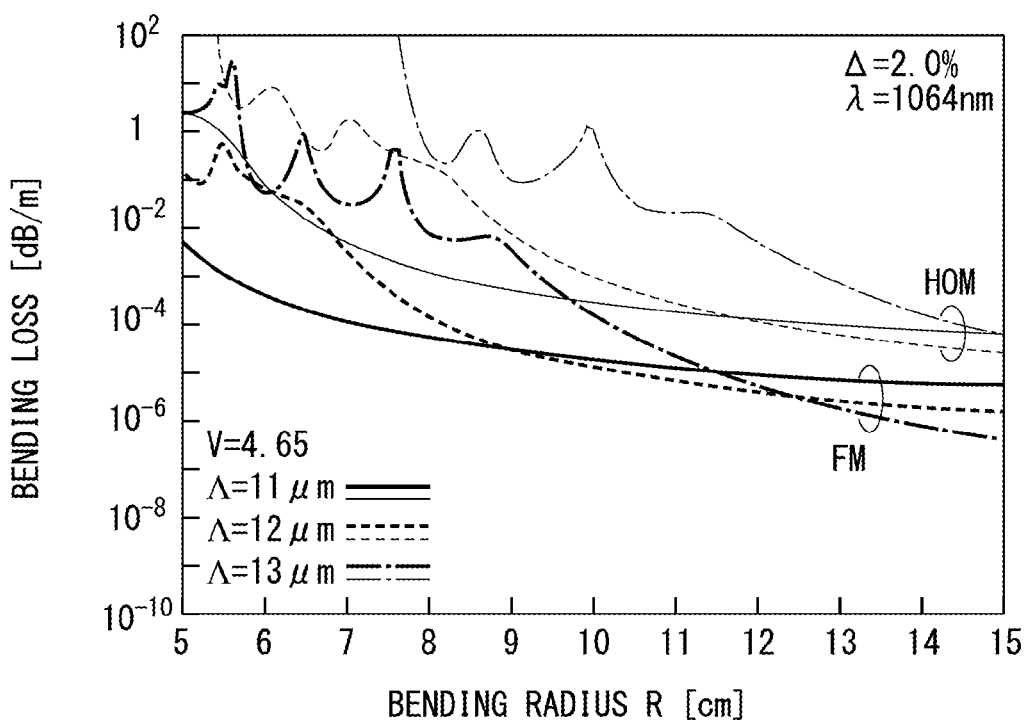
FIG. 12 is a diagrammatic view showing the diameter dependency of the fundamental mode and the high-order mode on the bending radius R of the bending loss at a third band gap in the solid photonic band gap fiber.
Figure 13:
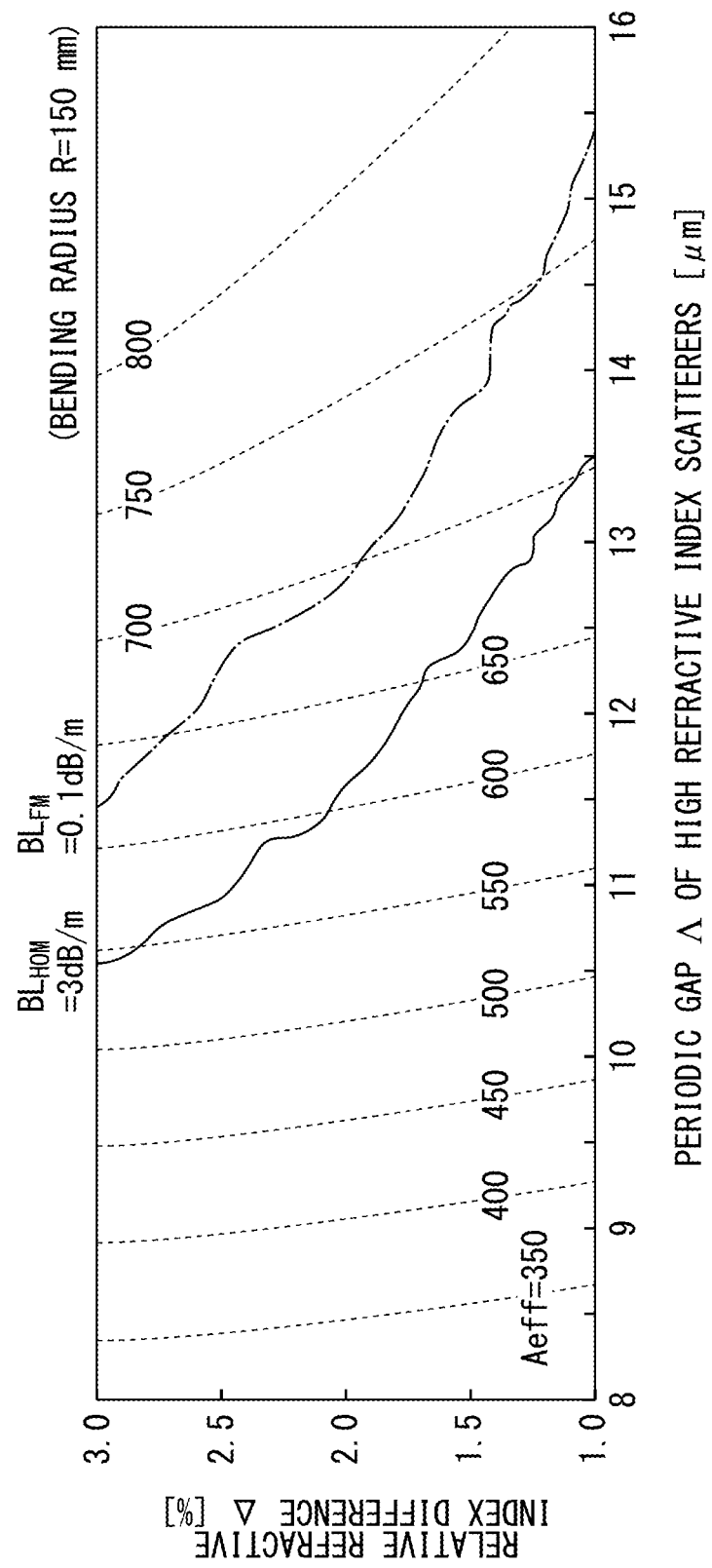
FIG. 13 is a diagrammatic view showing, in a case that the bending radius is 150 mm, the bending loss of an arbitrary fundamental mode, the bending loss of the high-order mode, and the relationship between the gap $\Lambda$ between high refractive-index scatterers and the relative refractive index difference $\Delta$, which is obtained through computation, in a case that the effective core cross-sectional area is realized in the solid photonic band gap fiber in which the high refractive index scatterers are periodically disposed in a triangular grid shape.
Figure 14:
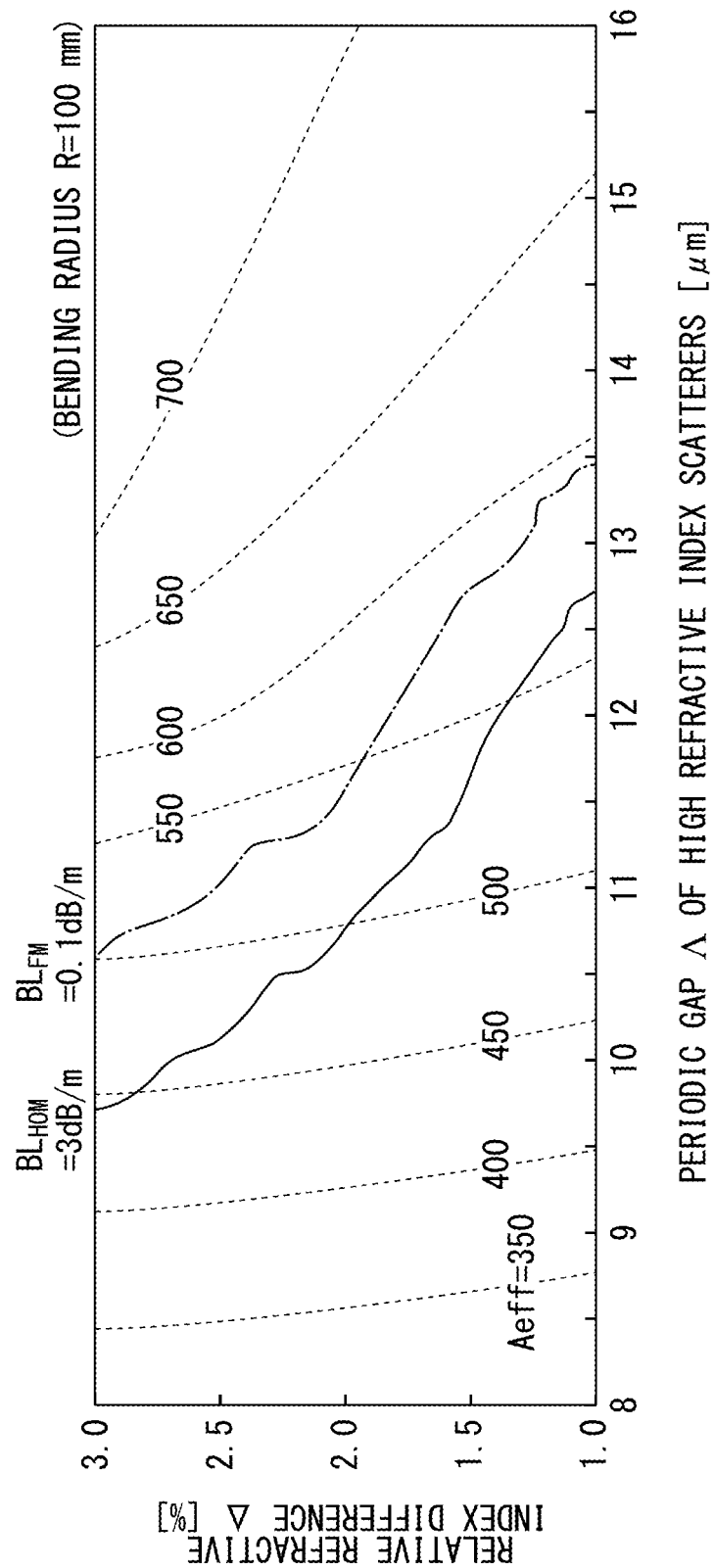
FIG. 14 is a diagrammatic view showing, similarly, in a case that the bending radius is 100 mm, the bending loss of an arbitrary fundamental mode, the bending loss of the high-order mode, and the relationship between the gap $\Lambda$ between high refractive-index scatterers and the relative refractive index difference $\Delta$, which is obtained through computation, in a case that the effective core cross-sectional area is realized in the solid photonic band gap fiber in which the high refractive index scatterers are periodically disposed in a triangular grid shape.
Figure 15:
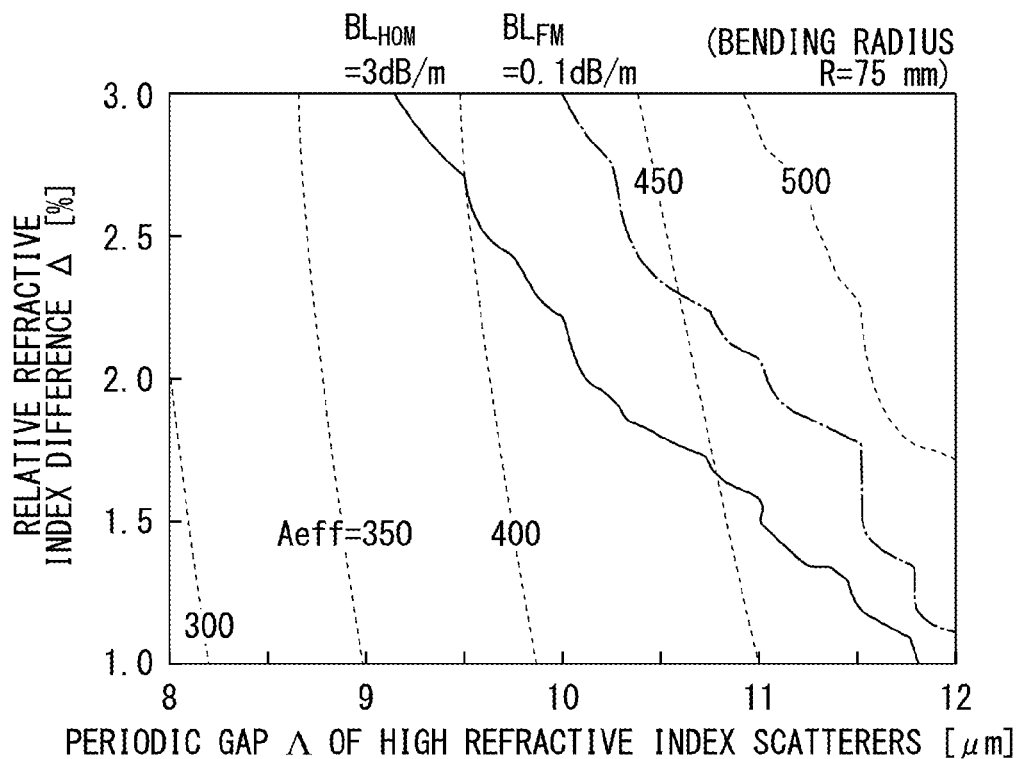
FIG. 15 is a diagrammatic view showing, similarly, in a case that the bending radius is 75 mm, the bending loss of an arbitrary fundamental mode, the bending loss of the high-order mode, and the relationship between the gap $\Lambda$ between high refractive-index scatterers and the relative refractive index difference $\Delta$, which is obtained through computation, in a case that the effective core cross-sectional area is realized in the solid photonic band gap fiber in which the high refractive index scatterers are periodically disposed in a triangular grid shape.
Figure 16:
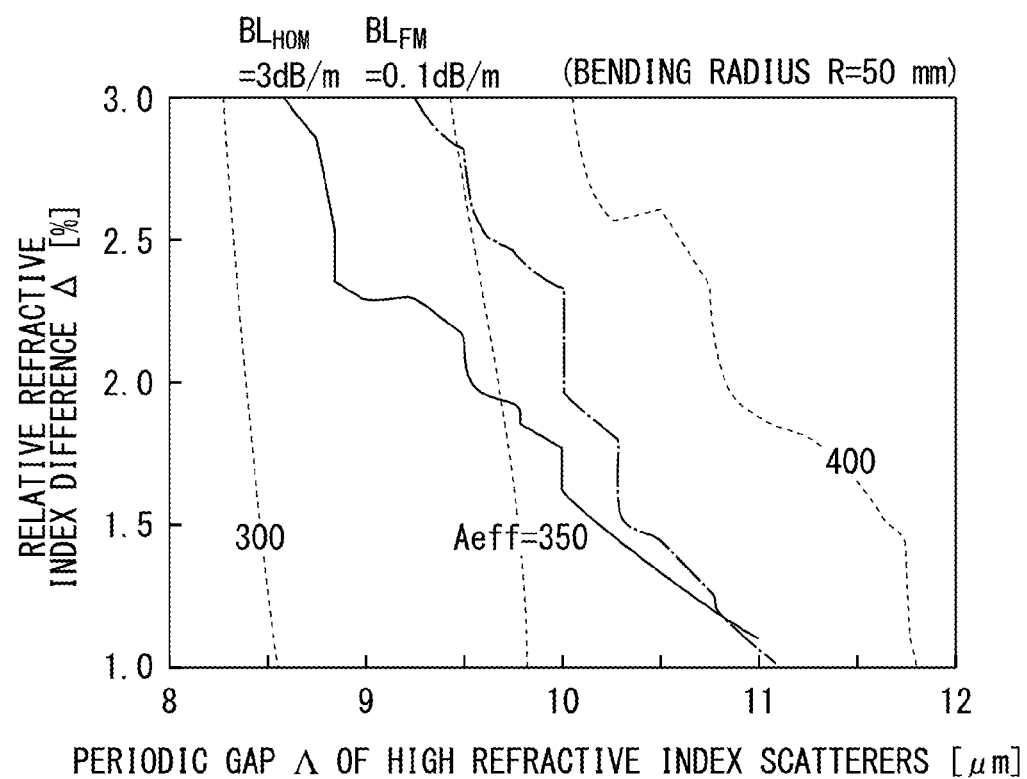
FIG. 16 is a diagrammatic view showing, similarly, in a case that the bending radius is 50 mm, the bending loss of an arbitrary fundamental mode, the bending loss of the high-order mode, and the relationship between the gap $\Lambda$ between high refractive-index scatterers and the relative refractive index difference $\Delta$, which is obtained through computation, in a case that the effective core cross-sectional area is realized in the solid photonic band gap fiber in which the high refractive index scatterers are periodically disposed in a triangular grid shape.

Meanwhile, FIG. 12 shows the dependency of the bending loss of the fundamental mode (FM) and the bending loss of the high-order mode (HOM) on the bending radius at the third band gap (3rd).

When FIG. 12 is compared with the computation results (FIG. 8) of a case in which the first band gap (1st) is used, the difference between the bending loss of the fundamental mode (FM) and the bending loss of the high-order mode (HOM) is small in any bending radius R.

Therefore, it is found that the third band gap can be provided for practical use, but the first band gap (1st) is more preferable than the third band gap (3rd).

Setting of the bending radius of the fiber for realizing single mode propagation, that is, setting of the bending radius of the fiber for increasing the difference between the bending loss of the high-order mode and the bending loss of the fundamental mode is also important in consideration of a practical apparatus such as a fiber module.

A fiber module configured by winding the fiber of the invention in a coil shape or an apparatus in which the fiber of the invention is used in a wound state is desirably made to be as compact as possible in consideration of the installation area and the like.

Therefore, the bending radius of the fiber is desirably as small as possible.

In addition, when the fiber is stored in a rack size, the bending radius is desirably 200 mm or less.

Meanwhile, when the fiber is wound into an extremely small size, there is a concern that the fiber may snap due to mechanical fracture.

Considering the above, the bending radius is desirably 40 mm or more from the viewpoint of long-term reliability.

Furthermore, structure conditions under which a low loss is maintained with respect to the fundamental mode, and substantial single mode propagation is possible in a case that the high refractive index scatterers are periodically disposed in a triangular grid shape will be described with reference to FIGS. 13 to 16.

FIGS. 13 to 16 are graphs (the computation wavelength $\lambda$ is 1064 nm) showing the bending loss of an arbitrary fundamental mode, the bending loss of the high-order mode, and the relationships between $\Lambda$ and $\Delta$ in a case that the effective core cross-sectional area is realized in a case that the bending radius is 150 mm, 100 mm, 75 mm, and 50 mm, respectively.

Heavy solid lines in the drawings show a design parameter ($BL_{HOM}$) at which the bending loss of the high-order mode becomes 3 dB/m, and the bending loss of the high-order mode increases toward the upper right-hand corner in the respective drawings.

In addition, heavy dashed lines in the drawings show a design parameter ($BL_{FM}$) at which the bending loss of the fundamental mode becomes 0.1 dB/m, and the bending loss of the fundamental mode decreases toward the lower left-hand corner in the respective drawings.

Here, the fact that the bending loss of the fundamental mode is 0.1 dB/m or less, and the bending loss of the high-order mode is 3 dB/m or more is a desirable condition of the bending loss in order to substantially secure single mode propagation.

Therefore, in the respective drawings of FIGS. 13 to 16, areas surrounded by the heavy solid lines ($BL_{HOM}$) and the heavy dashed lines ($BL_{FM}$) are areas in which the desired bending loss can be obtained (areas in which the bending loss of the fundamental mode is 0.1 dB/m or less, and the bending loss of the high-order mode is 3 dB/m or more).

Additionally, FIGS. 13 to 16 also show the isograms of the effective core cross-sectional area $A_{eff}$ using fine broken lines.

As understandable from FIGS. 13 to 16, when the fiber is held at the same bending radius, when $\Delta$ is high, it is possible to obtain a desired bending loss in areas having a small $\Lambda$, and an effective core cross-sectional area $A_{eff}$ of 300 $\mu m^2$ or more can be secured.

On the other hand, when $\Delta$ is low, it is possible to obtain a desired bending loss in areas having a large $\Lambda$, and the effective core cross-sectional area $A_{eff}$ can be further increased.

In addition, it is found from comparison of FIGS. 13 to 16 that areas surrounded by the heavy solid lines ($BL_{HOM}$) and the heavy broken lines ($BL_{FM}$), that is, areas in which a desired bending loss can be obtained shift toward the areas having a small $\Lambda$ as the bending radius decreases, and, accordingly, the realizable effective core cross-sectional area $A_{eff}$ decreases.

Based on the above results, conditions for obtaining desired characteristics become as follows.

That is, basically, as described in the tenth aspect (corresponding to Claim 10), in order to secure an effective core cross-sectional area of 300 $\mu m^2$ or more, and enable substantial single mode propagation using the difference in the bending loss between the fundamental mode and the high-order mode, $\Lambda$ is in a range of 8 $\mu m$ to 16 $\mu m$, and $\Delta$ is in a range of 1.0% to 3.0% as described in the ninth aspect (corresponding to Claim 9).

Furthermore, with particular emphasis on enlargement of the effective core cross-sectional area, in order to secure an effective core cross-sectional area of 450 $\mu m^2$ or more, and enable substantial single mode propagation using the difference in the bending loss between the fundamental mode and the high-order mode as described in the twelfth aspect (corresponding to Claim 12), $\Lambda$ needs to be in a range of 10 $\mu m$ to 16 $\mu m$, and $\Delta$ needs to be in a range of 1.3% to 3.0% as described in the eleventh aspect (corresponding to Claim 11).

In that case, the bending radius R is in a range of 90 mm to 200 mm, and single mode propagation is substantially realized.

Conversely, with emphasis on the bending radius so as to make the fiber preferable for storage in a saved space, in order to substantially realize single mode propagation at a small bending radius, for example, in a range of 40 mm to 90 mm as described in the fourteenth aspect (corresponding to Claim 14), $\Lambda$ needs to be in a range of 8 $\mu m$ to 11 $\mu m$, and $\Delta$ needs to be in a range of 1.5% to 3.0% as described in the thirteenth aspect (corresponding to Claim 13).

In that case, an effective core cross-sectional area of 350 $\mu m^2$ or more can be realized.

In addition, regarding the bending loss of the fundamental mode and the high-order mode, it is described above that the bending loss of the fundamental mode is desirably 0.1 dB/m or less, and the bending loss of the high-order mode is desirably 3 dB/m or more, but the difference in the bending loss between the fundamental mode and the high-order mode is more desirably as large as possible.

For that, the bending loss of the high-order mode is more preferably set to, for example, 10 dB/m or more.

At this time, the design ranges of $\Lambda$ and $\Delta$ need to be appropriately adjusted, and the design ranges are approximately the same as in a case that the bending loss of the high-order mode is 3 dB/m or more.

Also, the respective computations above were carried out with an assumption that $\Delta$ has a step-form refractive index distribution.

Figure 17:
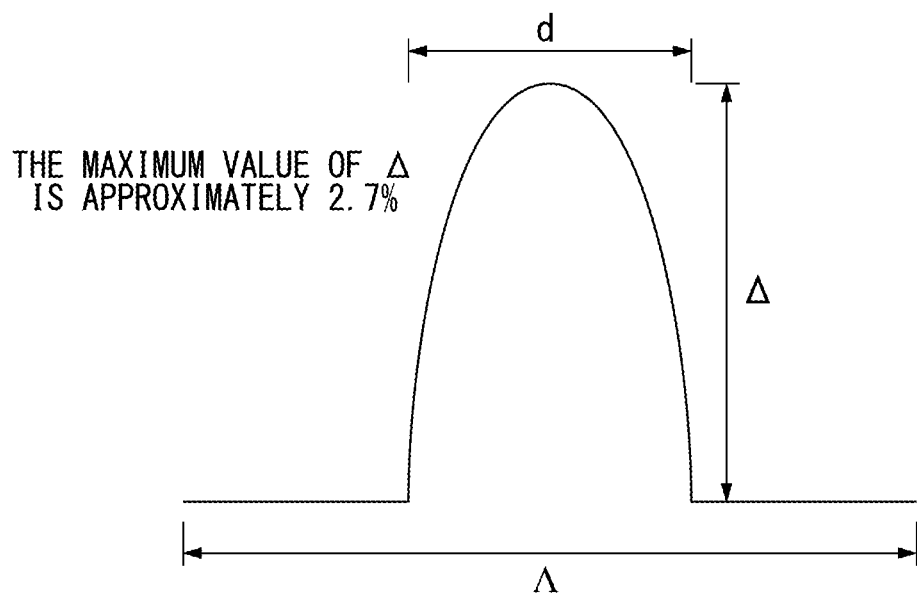
FIG. 17 is a schematic view showing an example of the relative refractive index difference of actual high refractive index scatterers in the solid photonic band gap fiber.

However, when the high refractive index portions are actually manufactured, for example, as in FIG. 17, there are cases in which a shear drop occurs in the refractive index distribution, or a non-rectangular refractive index distribution termed horn or dip is generated.

In addition, there are cases in which a non-step-form refractive index distribution is intentionally provided due to manufacturing circumstances.

In this case, the shape of the refractive index distribution in the high refractive index portions does not matter as long as the refractive index of the core area is effectively in the above range of $\Delta$ in terms of the step-form.

Meanwhile, for example, in the case of FIG. 17, the refractive index at the peak is 2.7%; however, when the refractive index is converted in terms of the step-form, $\Delta$ is approximately 2.0%.

Finally, the meaning of substantial single mode propagation will be described.

Thus far, description has been made using the loss of the fundamental mode and the loss of the high-order mode as the index of substantial single mode propagation.

However, it is difficult to measure the losses in an actually manufactured fiber.

Practically, substantial single mode propagation refers to the fact that, when any signal light (in the case of an amplification fiber, the signal light may be oscillation light generated at a cavity) is made incident on the fiber, the beam quality ($M^2$: M square value) is 1.2 or less at the output of the fiber.

Also, the $M^2$ value becomes one in ideal single mode propagation.

In addition, it is possible to easily make the $M^2$ value be 1.2 or less by using the solid photonic band gap fiber of the invention.

Furthermore, thus far, a case that the normalized frequency V is 1.6 has been described as an example; however, in practical use, the above effect rarely changes even when V is used at a slightly different wavelength.

For example, when the operating waveband is in the first permeation band of the solid photonic band gap fiber, when the normalized frequency V is used at a wavelength in a range of 1.2 to 2.0, it is possible to similarly consider that, substantially, V is 1.6.

Furthermore, the solid photonic band gap fiber of the invention can exhibit the effects when used in an optical fiber module in which at least some of the fiber in the longitudinal direction is bent at the above desirable bending radius or an optical fiber module in which the fiber is bent in a coil shape at the above desirable bending radius one turn or more than two turns.

In addition, in a case that the solid photonic band gap fiber of the invention is used as a fiber amplifier or a fiber laser, the solid photonic band gap fiber is effective that the solid photonic band gap fiber is used as an optical fiber bent at the desired bending radius in at least some portion or bent in a coil shape.

In addition, the solid photonic band gap fiber of the invention may have a bending radius holding portion a part of which can be always held at a predetermined bending radius.

In this case, when the solid photonic band gap fiber is used in an optical fiber module, a fiber amplifier, or a fiber laser, the fiber of the invention can securely realize only single mode propagation by having the bending radius holding portion.

Furthermore, when the solid photonic band gap fiber is used in a fiber amplifier or a fiber laser, the configuration of portions other than the optical fiber may be basically the same as the configuration of the well-known fiber amplifier or fiber laser.

Hereinafter, examples in which a solid photonic band gap fiber is actually manufactured using the above method will be described.

Furthermore, the following examples simply describe specific effects in examples in which the invention is actually applied, and the description of the examples does not limit the technical scope of the invention.

Example 1

In Example 1, basically, the core area was as large as two layers (seven-cell core structure), and the first band gap was used as the permeation band.

Specifically, as shown in FIG. 5, Example 1 has a structure which is a two-layer equivalent core type, and has high refractive index scatterers periodically arrayed in a triangular grid shape.

In manufacturing the fiber, the target $\Lambda$ was 11 μm, and the target $\Delta$ was 2.0%.

In addition, d was adjusted (approximately 1.8 μm) so that V became approximately 1.6.

Therefore, when the fiber is used at a wavelength of 1064 nm, the first band gap is used as the permeation band.

The material of the preform of the optical fiber mainly included silica glass, germanium-added silica glass was used as the material of the high refractive index scatterers, and the preform of the stacking structure was manufactured using the stack and draw method.

In addition, the preform of the stacking structure was spun while controlling the outer diameter of the fiber so that $\Lambda$ became 11 μm, and protective coating was carried out using a material made of a urethane acrylate-based UV resin, thereby obtaining a fiber.

The outer diameter of the obtained fiber was approximately 210 μm.

As a result of measuring the characteristics of the fiber, the transmission loss was 0.03 dB/m at a wavelength of 1064 nm.

In addition, as a result of measuring the output beam qualities of the specimen fiber using an $M^2$ measuring device while changing the bending radius, $M^2$ became 1.2 or less at a bending radius of approximately 120 mm or less.

Furthermore, as a result of measuring the output optical power while changing the bending conditions under conditions in which the bending radius decreased, the dependency of the output optical power on the bending radius did not appear until the bending radius reached approximately 70 mm, and the output optical power gradually decreased from 70 mm.

This means that the bending loss of the fundamental mode is not observed in a case that the bending radius is approximately 70 mm or more.

That is, the fiber is a low loss fiber.

Furthermore, as a result of measuring the effective core cross-sectional area at the respective bending radii, the measured effective core cross-sectional area was approximately 520 μm² in a case that the bending radius was 120 mm, approximately 470 μm² in a case that the bending radius was 100 mm, and approximately 440 μm² in a case that the bending radius was 70 mm.

Example 2

In Example 2, basically, similarly to Example 1, the core area was as large as two layers (seven-cell core structure).

The third band gap was used as the permeation band.

Specifically, as shown in FIG. 5, Example 2 has a structure which is a two-layer equivalent core type, and has high refractive index scatterers periodically arrayed in a triangular grid shape.

In manufacturing the fiber, the target $\Lambda$ was 13 μm, and the target $\Delta$ was 2.5%.

In addition, d was adjusted (approximately 4.8 μm) so that V became approximately 4.65.

Therefore, when the fiber is used at a wavelength of 1064 nm, the third band gap is used as the permeation band.

The material of the preform of the optical fiber mainly included silica glass, germanium-added silica glass was used as the material of the high refractive index scatterers, and the preform of the stacking structure was manufactured using the stack and draw method.

The preform of the stacking structure was spun while controlling the outer diameter of the fiber so that $\Lambda$ became 13 μm, and protective coating was carried out using a material made of a urethane acrylate-based UV resin, thereby obtaining a fiber.

The outer diameter of the obtained fiber was approximately 250 μm.

As a result of measuring the characteristics of the fiber, the transmission loss was 0.07 dB/m at a wavelength of 1064 nm.

In addition, as a result of measuring the output beam qualities of the specimen fiber using an $M^2$ measuring device while changing the bending radius, $M^2$ became 1.2 or less at a bending radius of approximately 100 mm or less.

Furthermore, as a result of measuring the output optical power while changing the bending conditions under conditions in which the bending radius decreased, the dependency of the output optical power on the bending radius did not appear until the bending radius reached approximately 60 mm, and the output optical power gradually decreased from 60 mm.

This means that the bending loss of the fundamental mode is not observed in a case that the bending radius is approximately 60 mm or more.

That is, the fiber is a low loss fiber.

Furthermore, as a result of measuring the effective core cross-sectional area at the respective bending radii, the measured effective core cross-sectional area was approximately 430 μm² in a case that the bending radius was 100 mm, and approximately 380 μm² in a case that the bending radius was 60 mm.

Example 3

Example 3 is basically an example in which, similarly to Example 1, the core area was as large as two layers (seven-cell core structure), the first band gap was used as the permeation band, and the refractive index distribution of the high refractive index scatterers was not rectangular.

Specifically, as shown in FIG. 5, Example 3 has a structure which is a two-layer equivalent core type, and has high refractive index scatterers periodically arrayed in a triangular grid shape.

A fiber having the high refractive index scatterers with a non-step-form refractive index distribution (refer to FIG. 17) in which Λ was 11 μm, and Δ became 2.0% in terms of the step form was manufactured.

In addition, d was adjusted (approximately 1.8 μm) so that V became approximately 1.6.

Therefore, when the fiber is used at a wavelength of 1064 nm, the first band gap is used as the permeation band.

The material of the preform of the optical fiber mainly included silica glass, germanium-added silica glass was used as the material of the high refractive index scatterers, and the preform of the stacking structure was manufactured using the stack and draw method.

The preform of the stacking structure was spun while controlling the outer diameter of the fiber so that Λ became 11 μm, and protective coating was carried out using a material made of a urethane acrylate-based UV resin, thereby obtaining a fiber.

The outer diameter of the obtained fiber was approximately 240 μm.

As a result of measuring the characteristics of the fiber, the transmission loss was 0.01 dB/m at a wavelength of 1064 nm.

In addition, as a result of measuring the output beam qualities of the specimen fiber using an $M^2$ measuring device while changing the bending radius, $M^2$ became 1.2 or less at a bending radius of approximately 130 mm or less.

Furthermore, as a result of measuring the output optical power while changing the bending conditions under conditions in which the bending radius decreased, the dependency of the output optical power on the bending radius did not appear until the bending radius reached approximately 60 mm, and the output optical power gradually decreased from 60 mm.

This means that the bending loss of the fundamental mode is not observed in a case that the bending radius is approximately 60 mm or more.

That is, the fiber is a low loss fiber.

Furthermore, as a result of measuring the effective core cross-sectional area at the respective bending radii, the measured effective core cross-sectional area was approximately 530 μm² when the bending radius was 130 mm, was approximately 510 μm² when the bending radius was 100 mm, and was approximately 420 μm² when the bending radius was 60 mm.

Example 4

Example 4 is basically an example in which, similarly to Example 1, the core area was as large as two layers (seven-cell core structure), the first band gap was used as the permeation band, and the effective core cross-sectional area $A_{eff}$ was enlarged.

Specifically, as shown in FIG. 5, Example 4 has a structure which is a two-layer equivalent core type, and has high refractive index scatterers periodically arrayed in a triangular grid shape.

A fiber having the high refractive index scatterers with the refractive index distribution shown in FIG. 17 in which Λ was 12.5 μm, and Δ became 1.5% in terms of the step form was manufactured.

In addition, d was adjusted (approximately 2.1 μm) so that V became approximately 1.6.

Therefore, when the fiber is used at a wavelength of 1064 nm, the first band gap is used as the band gap.

The material of the preform of the optical fiber mainly included silica glass, germanium-added silica glass was used as the material of the high refractive index scatterers, and the preform of the stacking structure was manufactured using the stack and draw method.

The preform of the stacking structure was spun while controlling the outer diameter of the fiber so that Λ became 12.5 μm, and protective coating was carried out using a material made of polyimide, thereby obtaining a fiber.

The outer diameter of the obtained fiber was approximately 280 μm.

As a result of measuring the characteristics of the fiber, the transmission loss was 0.09 dB/m at a wavelength of 1064 nm.

In addition, as a result of measuring the output beam qualities of the specimen fiber using an $M^2$ measuring device while changing the bending radius, $M^2$ became 1.2 or less at a bending radius of approximately 130 mm or less.

Furthermore, as a result of measuring the output optical power while changing the bending conditions under conditions in which the bending radius decreased, the dependency of the output optical power on the bending radius did not appear until the bending radius reached approximately 80 mm, and the output optical power gradually decreased from 80 mm.

This means that the bending loss of the fundamental mode is not observed in a case that the bending radius is approximately 80 mm or more.

That is, the fiber is a low loss fiber.

Furthermore, as a result of measuring the effective core cross-sectional area at the respective bending radii, the measured effective core cross-sectional area was approximately 590 μm² when the bending radius was 100 mm, and was approximately 480 μm² when the bending radius was 80 mm.

Example 5

Example 5 is basically an example in which, similarly to Example 1, the core area was as large as two layers (seven-cell core structure), the first band gap was used as the permeation band, and the bending radius was decreased so that the winding diameter could be decreased as a fiber module or the like.

Specifically, as shown in FIG. 5, Example 5 has a structure which is a two-layer equivalent core type, and has high refractive index scatterers periodically arrayed in a triangular grid shape.

A fiber having the high refractive index scatterers with the refractive index distribution shown in FIG. 17 in which Λ was 9 μm, and Δ became 2.5% in terms of the step form was manufactured.

In addition, d was adjusted (approximately 1.6 μm) so that V became approximately 1.6.

Therefore, when the fiber is used at a wavelength of 1064 nm, the first band gap is used as the band gap.

The material of the preform of the optical fiber mainly included silica glass, germanium-added silica glass was used as the material of the high refractive index scatterers, and the preform of the stacking structure was manufactured using the stack and draw method.

The preform of the stacking structure was spun while controlling the outer diameter of the fiber so that Λ became 9 μm, and protective coating was carried out using a material made of a urethane acrylate-based UV resin, thereby obtaining a fiber.

The outer diameter of the obtained fiber was approximately 160 μm.

As a result of measuring the characteristics of the fiber, the transmission loss was 0.01 dB/m at a wavelength of 1064 nm.

In addition, as a result of measuring the output beam qualities of the specimen fiber using an $M^2$ measuring device while changing the bending radius, $M^2$ became 1.2 or less at a bending radius of approximately 70 mm or less.

As a result of measuring the output optical power while changing the bending conditions under conditions in which the bending radius decreased, the dependency of the output optical power on the bending radius did not appear until the bending radius reached approximately 40 mm, and the output optical power gradually decreased from 40 mm.

This means that the bending loss of the fundamental mode is not observed in a case that the bending radius is approximately 40 mm or more.

That is, the fiber is a low loss fiber.

Furthermore, as a result of measuring the effective core cross-sectional area at the respective bending radii, the measured effective core cross-sectional area was approximately 370 $\mu m^2$ when the bending radius was 70 mm, and was approximately 330 $\mu m^2$ when the bending radius was 40 mm.

Example 6

In Example 6, basically, similarly to Example 1, the core area was as large as two layers (seven-cell core structure), the first band gap was used as the permeation band, and a fiber in which ytterbium (Yb) was added to the silica glass of the core area was used.

In addition, the outside claddings were provided so as to produce a double cladding structure.

Specifically, the double cladding structure refers to a structure in which the outside claddings were further provided to the fiber having a structure which is a two-layer equivalent core type and has the high refractive index scatterers periodically arrayed in a triangular grid shape which is shown in FIG. 5.

A fiber having the high refractive index scatterers with the refractive index distribution shown in FIG. 17 in which Λ was 11 µm, and Δ became 2.0% in terms of the step form was manufactured.

d was adjusted (approximately 1.8 µm) so that V became approximately 1.6.

Therefore, when the fiber is used at a wavelength of 1064 nm, the first band gap is used as the band gap.

The material of the preform of the optical fiber mainly included silica glass, and silica glass to which ytterbium was added at approximately 1 mol % in terms of ytterbium oxide ($Yb_2O_3$) was used as the material of the central two-layer equivalent portion in the core area.

Germanium-added silica glass was used as the material of the high refractive index scatterers, and the preform of the stacking structure was manufactured using the stack and draw method.

The preform of the stacking structure was spun while controlling the outer diameter of the fiber so that Λ became 11 µm, polymer claddings were supplied to the outside of the spun fiber as the outside claddings, and, furthermore, a fiber having the outside on which protective coating was carried out using a material made of a urethane acrylate-based UV resin was obtained.

The outer diameter of the obtained fiber was approximately 180 µm, and the outer diameter of the outside claddings was 240 µm.

As a result of measuring the characteristics of the fiber, the transmission loss was 0.1 dB/m at a wavelength of 1200 nm.

Furthermore, since ytterbium absorbs light having the operation wavelength at 1064 nm which is the operation wavelength, the transmission loss cannot be measured.

On the other hand, the absorption amount at the core at a wavelength of 976 nm was 1100 dB/m.

In addition, as a result of measuring the output beam qualities of the specimen fiber using an $M^2$ measuring device while changing the bending radius, $M^2$ became 1.2 or less at a bending radius of approximately 180 mm or less.

Furthermore, as a result of measuring the output optical power while changing the bending conditions under conditions in which the bending radius decreased, the dependency of the output optical power on the bending radius did not appear until the bending radius reached approximately 70 mm, and the output optical power gradually decreased from 70 mm.

This means that the bending loss of the fundamental mode is not observed in a case that the bending radius is approximately 70 mm or more, and it is found that a low loss fiber is formed.

As a result of measuring the effective core cross-sectional area at the respective bending radii, the measured effective core cross-sectional area was approximately 590 $\mu m^2$ when the bending radius was 180 mm, was approximately 520 $\mu m^2$ when the bending radius was 120 mm, and was approximately 440 $\mu m^2$ when the bending radius was 70 mm.

In addition, a resonator was configured by connecting a fiber grating to both ends of the fiber used in the present example so as to manufacture a fiber laser.

A laser was oscillated using a cladding pump method to the fiber laser, and $M^2$ was 1.0.

Example 7

Example 7 is basically an example in which, similarly to Example 1, the core area was as large as two layers (seven-cell core structure), the first band gap was used as the permeation band, and the effective core cross-sectional area $A_{eff}$ was enlarged.

Specifically, as shown in FIG. 5, Example 7 has a structure which is a two-layer equivalent core type, and has high refractive index scatterers periodically arrayed in a triangular grid shape.

A fiber having the high refractive index scatterers with the refractive index distribution shown in FIG. 17 in which Λ was 15 µm, and Δ became 1.0% in terms of the step form was manufactured.

In addition, d was adjusted to approximately 2.6 µm so that V became approximately 1.6.

Therefore, when the fiber is used at a wavelength of 1064 nm, the first band gap is used as the band gap.

The material of the preform of the optical fiber mainly included silica glass, germanium-added silica glass was used as the material of the high refractive index scatterers, and the preform of the stacking structure was manufactured using the stack and draw method.

The preform of the stacking structure was spun while controlling the outer diameter of the fiber so that Λ became 15 and protective coating was carried out using a material made of a urethane acrylate-based UV resin, thereby obtaining a fiber.

The outer diameter of the obtained fiber was approximately 250 µm.

As a result of measuring the characteristics of the fiber, the transmission loss was 0.07 dB/m at a wavelength of 1064 nm.

In addition, as a result of measuring the output beam qualities of the specimen fiber using an $M^2$ measuring device while changing the bending radius, $M^2$ became 1.2 or less at a bending radius of approximately 200 mm or less.

Furthermore, as a result of measuring the output optical power while changing the bending conditions under conditions in which the bending radius decreased, the dependency of the output optical power on the bending radius did not appear until the bending radius reached approximately 120 mm, and the output optical power gradually decreased from 120 mm.

This means that the bending loss of the fundamental mode is not observed in a case that the bending radius is approximately 120 mm or more.

That is, the fiber is a low loss fiber.

As a result of measuring the effective core cross-sectional area at the respective bending radii, the measured effective core cross-sectional area was approximately 760 μm² when the bending radius was 200 mm, and was approximately 670 μm² when the bending radius was 120 mm.

Example 8

Example 8 is basically an example in which, similarly to Example 1, the core area was as large as two layers (seven-cell core structure), the first band gap was used as the permeation band, and the effective core cross-sectional area $A_{eff}$ was increased.

Specifically, as shown in FIG. 5, Example 8 has a structure which is a two-layer equivalent core type, and has high refractive index scatterers periodically arrayed in a triangular grid shape.

A fiber having the high refractive index scatterers with the refractive index distribution shown in FIG. 17 in which Λ was 12.5 μm, and Δ became 1.4% in terms of the step form was manufactured.

In addition, d was adjusted to approximately 2.2 μm so that V became approximately 1.6.

Therefore, when the fiber is used at a wavelength of 1064 nm, the first band gap is used as the band gap.

The material of the preform of the optical fiber mainly included silica glass, germanium-added silica glass was used as the material of the high refractive index scatterers, and the preform of the stacking structure was manufactured using the stack and draw method.

The preform of the stacking structure was spun while controlling the outer diameter of the fiber so that Λ became 12.5 μm, and protective coating was carried out using a material made of a urethane acrylate-based UV resin, thereby obtaining a fiber.

The outer diameter of the obtained fiber was approximately 210 μm.

As a result of measuring the characteristics of the fiber, the transmission loss was 0.04 dB/m at a wavelength of 1064 nm.

In addition, as a result of measuring the output beam qualities of the specimen fiber using an $M^2$ measuring device while changing the bending radius, $M^2$ became 1.2 or less at a bending radius of approximately 150 mm or less.

Furthermore, as a result of measuring the output optical power while changing the bending conditions under conditions in which the bending radius decreased, the dependency of the output optical power on the bending radius did not appear until the bending radius reached approximately 90 mm, and the output optical power gradually decreased from 90 mm.

This means that the bending loss of the fundamental mode is not observed when the bending radius is approximately 90 mm or more.

That is, the fiber is a low loss fiber.

As a result of measuring the effective core cross-sectional area at the respective bending radii, the measured effective core cross-sectional area was approximately 640 μm² when the bending radius was 150 mm, and approximately 580 μm² when the bending radius was 90 mm.

The solid photonic band gap fiber, fiber module using the solid photonic band gap fiber, fiber amplifier, and fiber laser of the invention can be widely used as high-output fiber lasers, fiber amplifiers, and the like.

What is claimed is:

1. A solid photonic band gap fiber comprising:
a core area located at a central portion of a cross-section with respect to a longitudinal direction of the fiber, the core area being formed of a solid substance having a low refractive index;
cladding areas having base portions formed of a solid substance having a low refractive index, the cladding areas surrounding the core area; and
a plurality of fine high refractive index scatterers provided in the cladding areas, and disposed in a dispersed manner so as to surround the core area, the fine high refractive index scatterers being formed of a solid substance having a high refractive index,
wherein in a state that the solid photonic band gap fiber is held at a predetermined bending radius, propagation in a high-order mode is suppressed by using a difference in a bending loss between a fundamental mode and the high-order mode, and only the fundamental mode is substantially propagated, the fundamental mode and the high-order mode being caused by bending,
the high refractive index scatterers are periodically disposed in a triangular grid shape in the cladding areas surrounding the core area,
at least four or more layers of the high refractive index scatterers in the periodic structure are provided in a radius direction of the fiber,
when the high refractive index scatterers are assumed to be periodically disposed in a triangular grid shape toward a direction other than the radius direction from a central location of a transverse cross-section of the fiber, the core area has an area that corresponds to an area in which two or more layers of the high refractive index scatterers are removed from the central location of the transverse cross-section of the fiber,
a triangular grid-shaped periodic gap between the high refractive index scatterers is in a range of 10 μm to 16 μm, and a relative refractive index difference between the high refractive index scatterers and a parent material of the cladding areas is in a range of 1.3% to 3.0%, and
a predetermined bending radius is in a range of 90 mm to 200 mm, and an effective core cross-sectional area is 450 μm² or more.

2. A solid photonic band gap fiber comprising:
a core area located at a central portion of a cross-section with respect to a longitudinal direction of the fiber, the core area being formed of a solid substance having a low refractive index;
cladding areas having base portions formed of a solid substance having a low refractive index, the cladding areas surrounding the core area; and
a number of fine high refractive index scatterers provided in the cladding areas, and disposed in a dispersed manner so as to surround the core area, the number of fine high refractive index scatterers being formed of a solid substance having a high refractive index,
wherein in a state that the solid photonic band gap fiber is held at a predetermined bending radius, propagation in a high-order mode is suppressed by using a difference in a bending loss between a fundamental mode and the high-order mode, and only the fundamental mode is substantially propagated, the fundamental mode and the high-order mode being caused by bending, the high refractive index scatterers are periodically disposed in a triangular grid shape in the cladding areas surrounding the core area, at least four or more layers of the high refractive index scatterers in the periodic structure are provided in a radius direction of the fiber, when the high refractive index scatterers are assumed to be periodically disposed in a triangular grid shape toward a radial-outer direction from a central location of a transverse cross-section of the fiber, the core area has an area that corresponds to an area in which two or more layers of the high refractive index scatterers are removed from the central location of the transverse cross-section of the fiber, a triangular grid-shaped periodic gap between the high refractive index scatterers is in a range of 8 μm to 11 μm, and a relative refractive index difference between the high refractive index scatterers and the base portions of the cladding areas is in a range of 1.5% to 3.0%, and the predetermined bending radius is in a range of 40 mm to 90 mm, and an effective core cross-sectional area is 350 μm² or more.

3. The solid photonic band gap fiber according to claim 1, wherein the core area and the base portions of the cladding areas are constituted by a substance mainly including silica glass, and the high refractive index scatterers are constituted by silica glass to which germanium is added.

4. The solid photonic band gap fiber according to claim 1, wherein a bending loss of the fundamental mode in a state that the solid photonic band gap fiber is held at the predetermined bending radius is 0.1 dB/m or less, and the bending loss of the high-order mode is 3 dB/m or more.

5. The solid photonic band gap fiber according to claim 1, wherein an operating waveband is set in a first permeation band of the solid photonic band gap fiber.

6. The solid photonic band gap fiber according to claim 1, wherein the bending loss of the fundamental mode is 0.1 dB/m or less, and the bending loss of the high-order mode is 10 dB/m or more by holding the bending radius in a range of 40 mm to 200 mm.

7. The solid photonic band gap fiber according to claim 5, wherein a normalized frequency is used at a wavelength in a range of 1.2 to 2.0.

8. The solid photonic band gap fiber according to claim 1, further comprising:
an outside cladding layer having a low refractive index, the outside cladding layer being provided at an outside of the cladding areas.

9. The solid photonic band gap fiber according to claim 8, wherein the outside cladding layer is formed of a polymer cladding.

10. The solid photonic band gap fiber according to claim 8, wherein the outside cladding layer is formed of an air cladding or a holey cladding.

11. The solid photonic band gap fiber according to claim 1, wherein a material of the core area includes a fluorescent element.

12. The solid photonic band gap fiber according to claim 11, wherein the fluorescent element is a rare earth element.

13. The solid photonic band gap fiber according to claim 12, wherein the rare earth fluorescent element is ytterbium.

14. An optical fiber module, wherein at least some of the solid photonic band gap fiber of claim 1 is held at a predetermined bending radius.

15. An optical fiber module, wherein the solid photonic band gap fiber of claim 1 is wound at a predetermined radius into a coil shape.

16. An optical fiber laser or a fiber amplifier comprising:
a component which is the solid photonic band gap fiber according to claim 1 or an optical fiber module, the optical fiber module being the solid photonic band gap fiber according to claim 1 in which at least some of the solid photonic band gap fiber is held at a predetermined bending radius or the solid photonic band gap fiber of claim 1 wound at a predetermined radius into a coil shape.

* * * * *